United States Patent
Marques et al.

(10) Patent No.: US 6,643,706 B1
(45) Date of Patent: Nov. 4, 2003

(54) SCALEABLE ROUTE REDISTRIBUTION MECHANISM

(75) Inventors: Pedro M. Marques, San Jose, CA (US); Steven P. Lin, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/343,145

(22) Filed: Jun. 29, 1999

(51) Int. Cl.$^7$ ............................................. G06F 15/173
(52) U.S. Cl. ......................... 709/242; 709/238; 707/3; 707/101
(58) Field of Search ................................. 709/238, 242, 709/226, 231, 247, 230; 370/392, 394; 707/100, 101, 103, 3, 7

(56) References Cited

U.S. PATENT DOCUMENTS

| | | | | |
|---|---|---|---|---|
| 5,924,098 A | * | 7/1999 | Kluge ......................... | 707/100 |
| 5,946,679 A | * | 8/1999 | Ahuja et al. .................... | 707/3 |
| 6,061,712 A | * | 5/2000 | Tzeng ......................... | 709/202 |
| 6,067,574 A | * | 5/2000 | Tzeng ......................... | 709/247 |
| 6,192,051 B1 | * | 2/2001 | Lipman et al. .............. | 370/389 |
| 6,195,703 B1 | * | 2/2001 | Blumenau et al. .......... | 709/238 |
| 6,229,801 B1 | * | 5/2001 | Anderson et al. ........... | 370/349 |
| 6,252,876 B1 | * | 6/2001 | Brueckheimer et al. .... | 370/394 |
| 6,307,855 B1 | * | 10/2001 | Hariguchi .................... | 370/392 |
| 6,308,219 B1 | * | 10/2001 | Hughes ....................... | 709/238 |
| 6,356,216 B1 | * | 3/2002 | Chen et al. ................. | 341/118 |
| 6,505,241 B2 | * | 1/2003 | Pitts ........................... | 709/218 |

OTHER PUBLICATIONS

TCP/IP Illustrated vol. 2, by Gary R. Wright And W. Richard Stevens, Chapter 18, 559–600, 1995.*
Sedgewick, R. *Algorithms in C*. Addison–Wesley, Reading, Mass. 1990.
Sklower, K. "A Tree–Based Packet Routing Table for Berkeley Unix," *Proceedings of the 1991 Winter USENIX Conference*, pp. 993–999, Dallas, Texas. 1991.
Wright, Gary R., Stevens, W. Richard, *TCP/IP Illustrated, vol. 2, The Implementation*, Chapters 4, 10, 14, 15, and 17. Addison–Wesley, Reading, Mass. 1995.

* cited by examiner

*Primary Examiner*—Ario Etienne
*Assistant Examiner*—Abdullahi E. Salad
(74) *Attorney, Agent, or Firm*—Campbell Stephenson Ascolese LLP

(57) ABSTRACT

A method of distributing route information is described. The method includes maintaining a number of entries, indicating that at least one of the entries, requiring processing by a first process, has been processed by the first process, and causing the first process to process another of the entries requiring processing by the first process based on the indication. In doing so, the first process uses the indication to decide which of the entries requiring processing the process has already processed and which of those entries remain to be processed. Each one of the entries preferably corresponds to at least one characteristic of a network connection between a number of network elements, such as a route between network elements.

13 Claims, 16 Drawing Sheets

SCALEABLE ROUTE REDISTRIBUTION MECHANISM

BACKGROUND OF THE INVENTION

1. Field of the Invention

The present invention relates to network routers, and, more particularly, to a method and apparatus for redistributing routing changes between routing protocols and other processes running on a router.

2. Description of the Related Art

As the amount of information carried by today's networks continues to increase, ways of improving the scaleability and efficiency of network elements becomes increasingly important. Such efficiency and scaleability is of particular importance in network elements through which large amounts of network traffic must pass. One such network element is the router, a device that directs network traffic between hosts. Routers build routing tables that contain their collected information on the paths to destinations that the router knows how to reach. Routers both announce and receive route information to and from other routers. This information goes into the router's routing table. Routers develop a hop-by-hop mechanism by keeping track of the "next hop" information that enables a data packet to find its destination through the network. A router that does not have a direct physical connection to the destination of the information being routed resorts to the local routing table and forwards the information to another router that is closer to the desired destination. This process repeats itself until the information works its way through the network to the desired destination.

A router can employ several different protocols in supporting the routing of information through the network. These routing protocols can generally be divided into interior gateway protocols (IGPs), such as the router information protocol (RIP), the interior gateway routing protocol (IGRP), the enhanced interior gateway routing protocol (EIGRP), the open shortest path first (OSPF) protocol, and the intermediate system-to-intermediate system (ISIS) protocol, within their boundaries, and interconnect via an exterior gateway protocol (EGP) such as the border gateway protocol (BGP), among other such protocols.

FIG. 1 illustrates an exemplary software architecture 100 of the prior art. Included in software architecture 100 is a router operating system 110 that supports the operation of the router (not shown) on which software architecture 100 is implemented. Software modules running on router operating system 110 include routing protocols 120(1)–(N) and a routing table module 130. Routing table module 130 includes a routing table 140, as shown in FIG. 1. Routing protocols 120(1)–(N) include IGPs, such as RIP, IGRP, EIGRP, OSPF and ISIS, and EGPs such as BGP. In the router software architecture shown in FIG. 1 (software architecture 100), router operating system 110 is of a single-threaded design. As such, control passes from module to module and only one thread of execution is executed at any one time.

In such existing implementations, there exists a mechanism for the synchronous, data-driven notification of changes in the routes stored in routing table 140. This notification is passed to processes that are enabled in router operating system 110, and that may include processes such as one or more of routing protocols 120(1)–(N), maintenance processes, monitoring processes and other processes registered for notification in the event of certain changes in routing table 140. Because such processes are most commonly routing protocols (e.g., routing protocols 120(1)–(N)), such registered processes will be referred to herein under the umbrella term "routing protocols" without loss of generality. The process of notification in response to a change in routing table 140 is referred to herein as route redistribution.

In router operating system 110, the notification mechanism is referred to as synchronous because the notification for a change in one or more routes (a change in routing table 140) is processed by one routing protocol before the same change notification can be delivered to another routing protocol or before another change notification for another route can be delivered. The synchronicity of this function is imposed by the single-threaded execution employed in router operating system 110. Notification in such a system may be implemented, for example, as a function callback. This means that a calling process must wait for the subroutine call to routing table module 130 to complete before the calling process can proceed. Each process requiring notification of the change to routing table 140 must be notified by routing table module 130 prior to routing table module 130 returning from the subroutine call to the calling process.

The notification mechanism is referred to herein as being data-driven to indicate a change notification is delivered to registered processes immediately upon any routing change, such as the addition, modification or deletion of a route in routing table 140. This presents the possibility of a situation in which the process updating the routing table (e.g., routing table module 130) exhibits a marked slowdown in processing due to the need to generate a large number of notifications.

The synchronous, data-driven nature of the notification mechanism also raises the problem that a routing protocol must always be prepared to accept the process change notifications. This mechanism imposes a restriction on the design and implementation of routing protocols. A more flexible approach would allow a routing protocol to accept process change notifications at its discretion, rather than at the discretion of the software module that is charged with maintaining the routing table (e.g., routing table module). A solution to this dilemma is the use of buffers. However, buffering suffers from the deficiencies noted subsequently, which are tied to the need for memory allocation and the finite resources available therefor.

In router operating system 110, change notifications are referred to herein as being selectable because a routing protocol can specify restrictions on change notifications, thereby restricting notifications of changes to those routes belonging to a specific set of one or more other routing protocols. For example, an EGP (e.g., BGP) might need to be informed of routing changes effected by an IGP (e.g., ISIS). BGP would include ISIS in the set of protocols for which BGP is to receive routing table change notifications. As the number of routing protocols is increased, the overhead of adding, modifying and deleting a route increases, particularly if a large number of the routing protocols are to receive notification of changes by a similarly large number of routing protocols. This increase in overhead is caused by the coupling between the act of making changes to routing table 140 and the need to synchronously distribute notification of that change to other of the routing protocols. As will be apparent to one of skill in the art, it is possible to restrict notifications based any number of criteria, of which restricting notifications using routing protocols is but one example.

One way to address the problems caused by this coupling is to separate the actions of updating routing table 140 and notifying routing protocols of the change. One means of effecting such a separation is through the use of buffers to hold the notifications. However, the use of buffers is not without problems. As will be appreciated by one of skill in the art, the use of buffers not only would be expected to consume memory, but in contemporary routers could be expected to consume relatively large amounts of memory (given that such routers might be expected to support over 50,000 routes in normal operation).

Another foreseeable drawback of buffers is the possibility of multiple buffering. In such a scenario, a perfect history is kept for each of the routing protocols receiving notifications of route changes in routing table 140. Because each routing protocol keeps a copy of the change history of routing table 140, large amounts of memory are consumed by the buffering of such changes. While compression techniques have been brought to bear on such problems, a satisfactory solution has not been achieved, due in part to the large number of routes that a contemporary router would be expected to support (again, on the order of over 50,000 routes). Thus, the synchronous, data-driven nature of the notification mechanism employed in contemporary router operating systems continues to impose one of the bottlenecks experienced in today's networks.

SUMMARY OF THE INVENTION

The present invention, in various embodiments, addresses the aforementioned problems by providing a simple and efficient technique for redistributing information regarding network connections among processes using that information. By maintaining one or more entries regarding each such connection and providing an indication regarding which of those entries have been processed by a given process (or, equivalently, which entries have not been processed), the given process can determine which entries require processing without the aforementioned buffering. Moreover, by allowing such processes to update their information regarding such connections asynchronously and without the use of buffering, per se, a method and apparatus according to the present invention simplifies the distribution of such information and allows the processes to proceed at their own pace.

In one embodiment of the present invention, a method of distributing route information is described. The method includes maintaining a number of entries, indicating that at least one of the entries, requiring processing by a first process, has been processed by the first process, and causing the first process to process another of the entries requiring processing by the first process based on the indication. In doing so, the first process uses the indication to decide which of the entries requiring processing the process has already processed and which of those entries remain to be processed. Each one of the entries preferably corresponds to at least one characteristic of a network connection between a number of network elements.

In one aspect of such an embodiment, the entries are route entries, each of which corresponds to a route in a network. In another aspect of such an embodiment, the method further includes detecting a change made to the routing table by a second process, notifying the first process of the change, and updating a marker corresponding to the first process. These actions exemplify the redistribution of network information from one process to another. This can be, for example, the redistribution of routing, information from one routing protocol to another. In such an embodiment, the marker indicates which of the entries requiring processing by the first process have been thus processed.

In one aspect of such an embodiment, maintaining the route entries can include adding a route entry or modifying a route entry. A route entry may be added, for example, by adding the route entry to the route entries, and indicating that the route entry has not been processed by the process. A route entry may be modified, for example, by selecting one of the route entries, modifying information regarding a route in the network corresponding to the new route entry being modified; and indicating that the new route entry that has not been processed by the process. Indicating can include, for example maintaining a marker, corresponding to the first process, configured to indicate which of the route entries requiring processing by the first process have not been processed by the first process.

In another embodiment of the present invention, a network element is disclosed. The network element includes a processor, a memory coupled to the processor, a first process executed by the processor, a data structure having a number of entries, and a marker. In one aspect of such an embodiment, the data structure is a linked list. The marker corresponds to the first process and is configured to indicate that at least one of the entries requiring processing by the first process has been processed by the first process. The marker is also preferably configured to designate a current one of the route entries, the process having processed the current route entry and those route entries previous to the current route entry in the linked list. This can be achieved by implementing the marker as a pointer into the linked list, by adding an entry to the linked list designated as a marker, or by some other appropriate method. In an alternative aspect of this embodiment, an index is used to define which of the possible route entries are to be processed by the first process. In such an embodiment, the network element is one of a number of network elements and the data structure is stored in the memory. Preferably, each one of the entries corresponds to at least one characteristic of a network connection between certain ones of the network elements.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Figure 1:
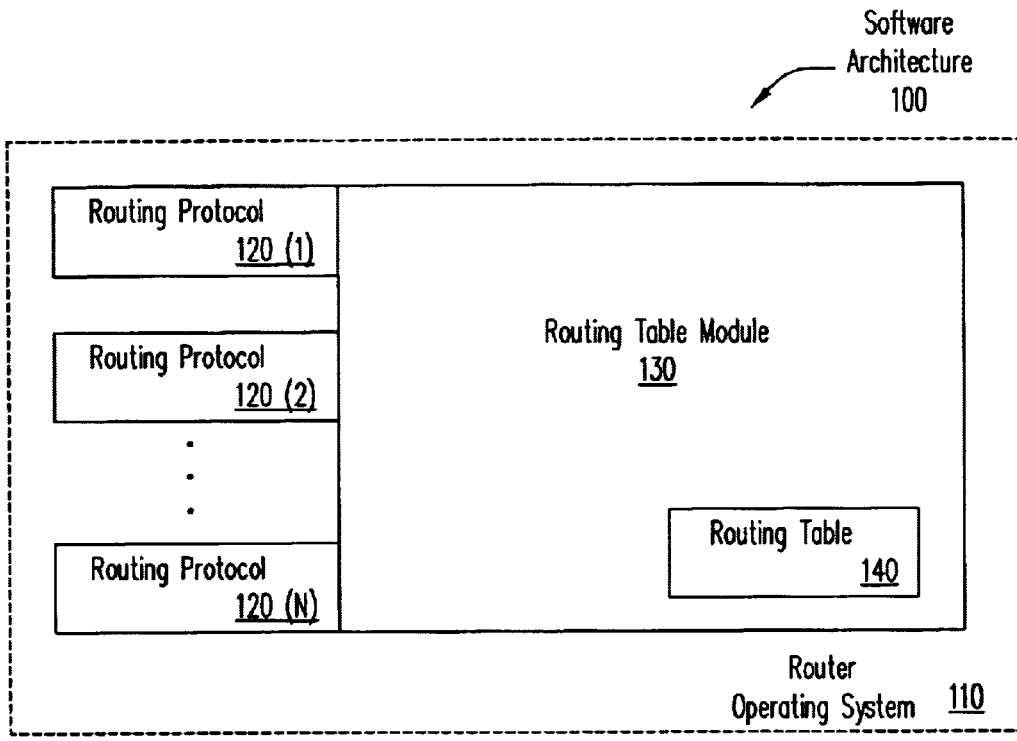
FIG. 1 illustrates a software architecture of the prior art.
Figure 2:
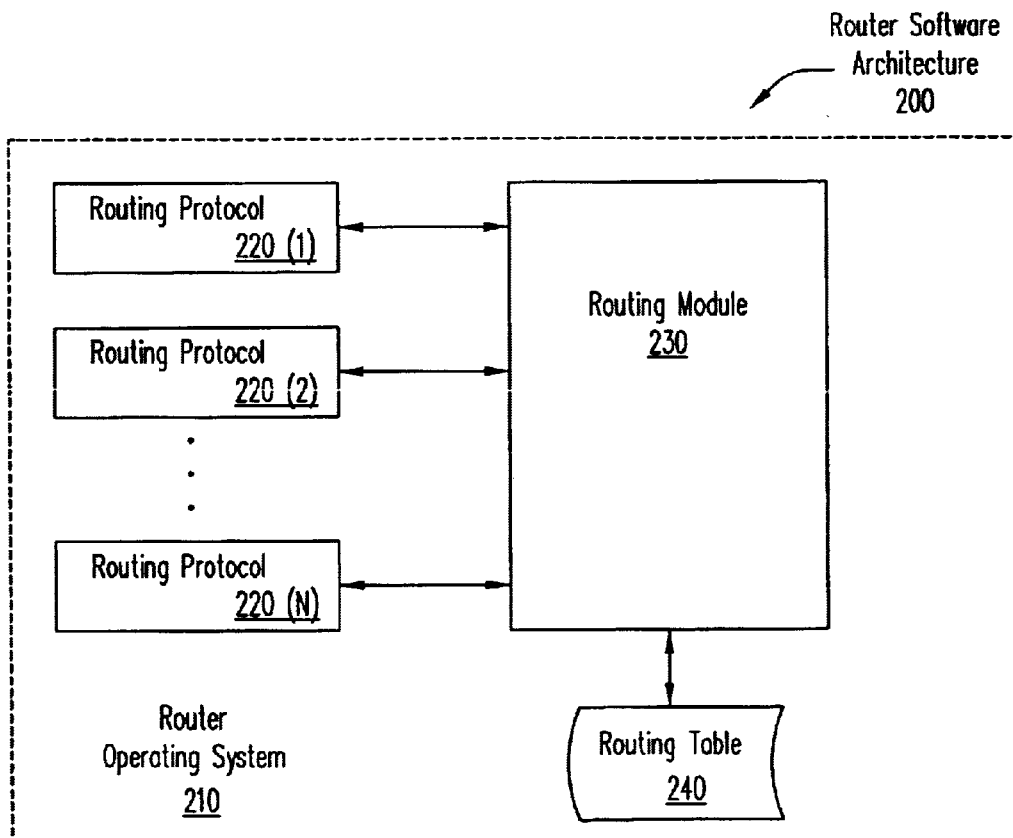
FIG. 2 illustrates one embodiment of a router software architecture according to the present invention.

FIG. 2 illustrates a router software architecture 200 that can be used to support an embodiment of the present invention. Router software architecture 200 is a multi-threaded architecture, meaning that multiple threads may be in some phase of execution at any one time. It will be noted that software architecture 100 could also be used to support an embodiment of the present invention, but will require modifications to do so, as would be apparent to one of skill in the art. Moreover, the single-threaded execution model used in software architecture 100 would likely not provide the same performance as the architecture used in router software architecture 200. The chief difference between software architecture 100 and router software architecture 200 is the use of multi-threaded execution in the latter. Preferably, a router operating system 210 of router software architecture 200 is a preemptive multitasking system that provides a protected memory space to each of the processes running thereon. Because each process running on router operating system 210 has its own memory space and can run as one or more separate threads of execution, a certain degree of fault isolation is achieved. Thus, if one of routing protocols 220(1)–(N) encounters a fault (i.e., "crashes"), only that process is effected. Conversely, in an architecture using single-threaded execution (e.g., software architecture 100), a fault in one of the processes running thereon can cause the entire system to fail. As has been noted, processes such as routing protocols 120(1)–(N) currently have routing changes forced upon them because the processes are interrupted and must then service the notification. In router software architecture 200, such processes can process notifications in an asynchronous manner, meaning that each of the processes can respond to such notifications at a time when they are best able to do so. When one or more of routing protocols 220(1)–(N) requests that a routing module 230 make changes to the routes stored in routing table 240, others of routing protocols 220(1)–(N) are notified of the change, and can process the change at their own pace.

The variable identifier "N" is used in several instances in FIG. 2, as well as in subsequent figures, to more simply designate the final element (e.g., routing protocol 220(N), etc.) of a series of related or similar elements (e.g., routing protocols 220(1)–(N), etc.). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" may hold the same or a different value than other instances of the same variable identifier.

Figure 3:
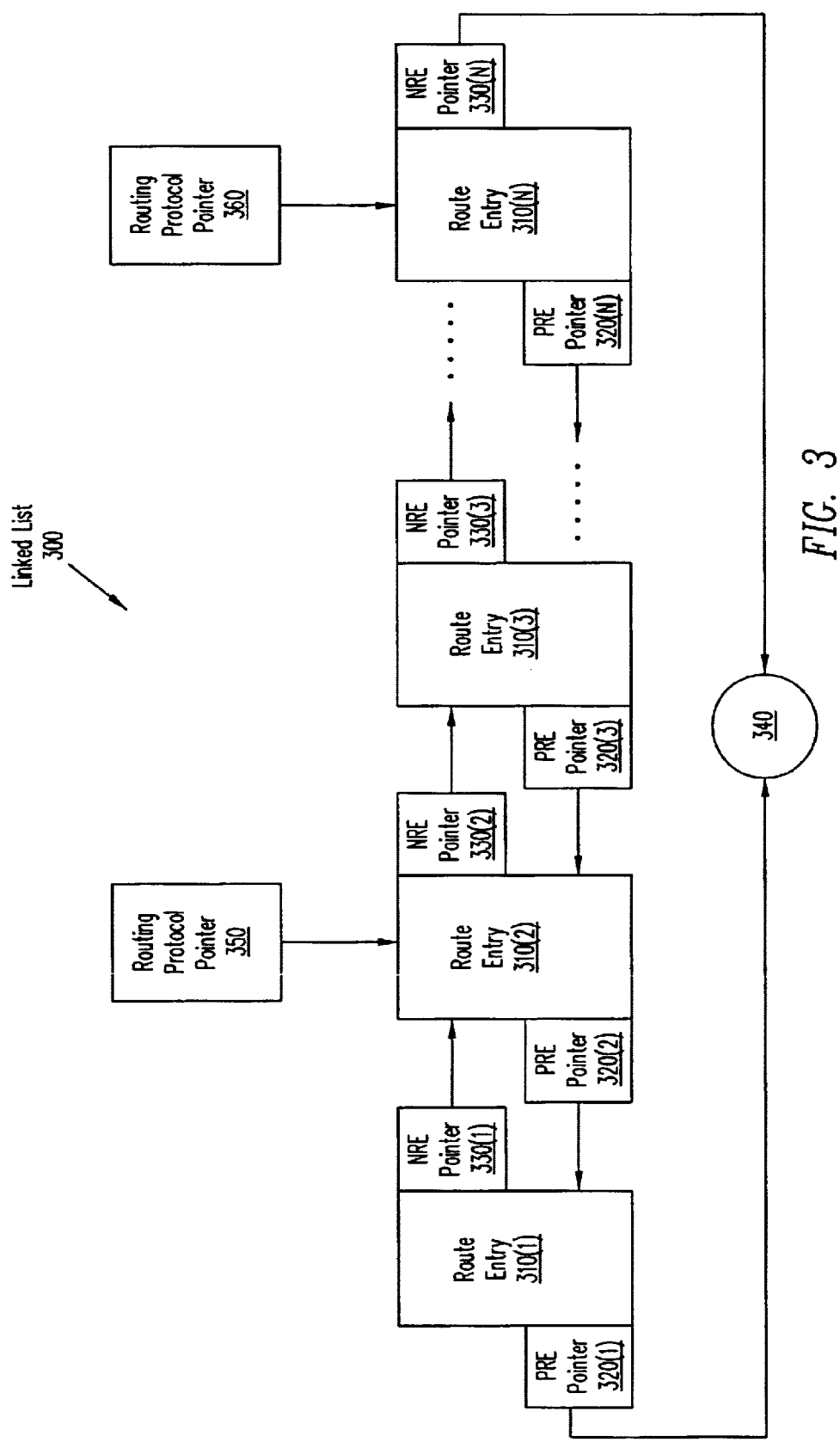
FIG. 3 illustrates a linked list of route entries according to one embodiment of the present invention.

FIG. 3 illustrates a linked list of route entries (exemplified by linked list 300) that maintains a list of routes that are currently active. Linked list 300 includes route entries 310(1)–(N). Each one of route entries 310(1)–(N) has associated with it a prior route entry pointer and a next route entry pointer (exemplified in FIG. 3 by PRE pointers 320(1)–(N) and NRE pointers 330(1)–(N), respectively). PRE pointer 320(1) and NRE pointer 330(N) are both set to point to a null location 340. This allows the detection of the beginning and end of linked list 300. NRE pointers (1)–(N–1) point to the respective next route entry in linked list 300. Similarly, PRE pointers (2)–(N) point to a previous one of route entries 310(1)–(N–1). A route entry is inserted into linked list 300 by determining an insertion point in the list, setting the NRE and PRE pointers of the route entry to be inserted to point at the appropriate route entries, setting the NRE pointer of the previous route entry to point at the new route entry, and setting the PRE pointer of the next route entry to also point to the new route entry. In a similar fashion, a route entry is deleted from linked list 300 by setting the NRE pointer of the previous route entry to point at the route entry's next route entry and setting the PRE pointer of the next route entry to point at the route entry's previous route entry. When deleting a route entry from linked list 300, it will be apparent to one of skill in the art that care should be taken to properly deallocate the deleted route entry in order to avoid any memory leaks that might be caused by this operation.

Using linked list 300, each one of routing protocols 220(1)–(N) (as well as other registered processes such as maintenance processes and monitoring processes) can be notified and updated with regard to changes in the routes represented by linked list 300 with relative ease. In order to keep track of changes to the routes represented by route entries 310(1)–(N), each one of routing protocols 220(1)–(N) maintains a marker indicating its progress through linked list 300. Buffering of route information is therefore made unnecessary. Such markers are exemplified by routing protocol pointers 350 and 360, although other implementations will be apparent to those skilled in the art. At a time that is deemed appropriate by the routing protocol corresponding to routing protocol pointer 350, for example, the routing protocol in question analyzes route entries 310(3)–(N) in a sequential manner in order to determine if one or more of route entries 310(3)–(N) are of interest to that routing protocol. In the scenario depicted in FIG. 3, route entries up to and including that route entry pointed to by routing protocol pointer 350 have already been analyzed and are considered to be "known" by the routing protocol with which routing protocol pointer 350 is associated. Thus, route entries 310(1) and 310(2) are considered to be known by the routing protocol that maintains routing protocol 350. The process of analyzing route entries continues up to the recently modified (MRM) position.

In the scenario depicted in FIG. 3, the route entry designated as route entry 3101(N) and pointed to by routing protocol pointer 360 is in the MRM position. This position can be detected, for example, by examining the NRE pointer of the route entry currently pointed to by the routing protocol pointer, and determining if that NRE pointer was set to null 340. In fact, routing protocol pointer 360 is shown in FIG. 3 as being up to date with regard to the current state of linked list 300. Route entries are updated in the manner previously described. If a route represented by a route entry in linked list 300 is to be deleted, the appropriate steps are taken to change the pointers, remove and deallocate that route entry. If a new route is to be installed by one of the routing protocols, the route entry representing that route is inserted into linked list 300 at the MRM position.

Changes to routes are effected by moving the route entry in question to the MRM position and making the necessary changes therein. One way to achieve this functionality is to merely combine the deletion and insertion functions previously described. Alternatively, the original next route entry and previous route entry pointers of the effected route entries can be adjusted to change the position of the route entry in question from its original position to the MRM position, and then the contents of the route entry changed at that point. Thus, any new or modified route entries should first appear at a predetermined location, in this case the MRM position. Other initial positions could also be employed. For example, the new or modified route entry could be positioned just one location past the last routing protocol marker of the last routing protocol needing to process the route being added or modified. The import of the new or modified route's position is that the new or modified route be placed such that all routing protocols having a need to process that route have an opportunity to do so.

One benefit of this approach is the reduction in storage requirements of the information regarding each route. Only one route entry need be allocated to maintain information regarding that route. There is no need for any of the currently-active routing protocols to maintain such information using such an architecture. Moreover, by simply maintaining a marker indicating the routing protocol's progress within linked list 300, each routing protocol is able to maintain the information necessary to track changes in various routes with a minimum of resources. Thus, by keeping route entries in linked list 300 (preferably, in order of their modification), the tracking of such changes is greatly simplified. The ability to process multiple changes at once is also of benefit because the routing protocols need not be constantly interrupted by notifications. Constant interruption is especially undesirable in a preemptive multi-tasking environment in which constantly servicing interrupts can drastically reduce performance In fact, there are at least three ways that markers in linked list 300 may be implemented: (1) pointers may be used to point to the last route entry analyzed by the given routing protocol (the scenario illustrated in FIG. 3); (2) each of route entries 310(1)–(N) may be designed with a flag for each possible routing protocol indicating whether that route entry has been processed by the routing protocol in question; or (3) a routing protocol marker in a form similar to that of a route entry may be inserted in the linked list.

Figure 4:
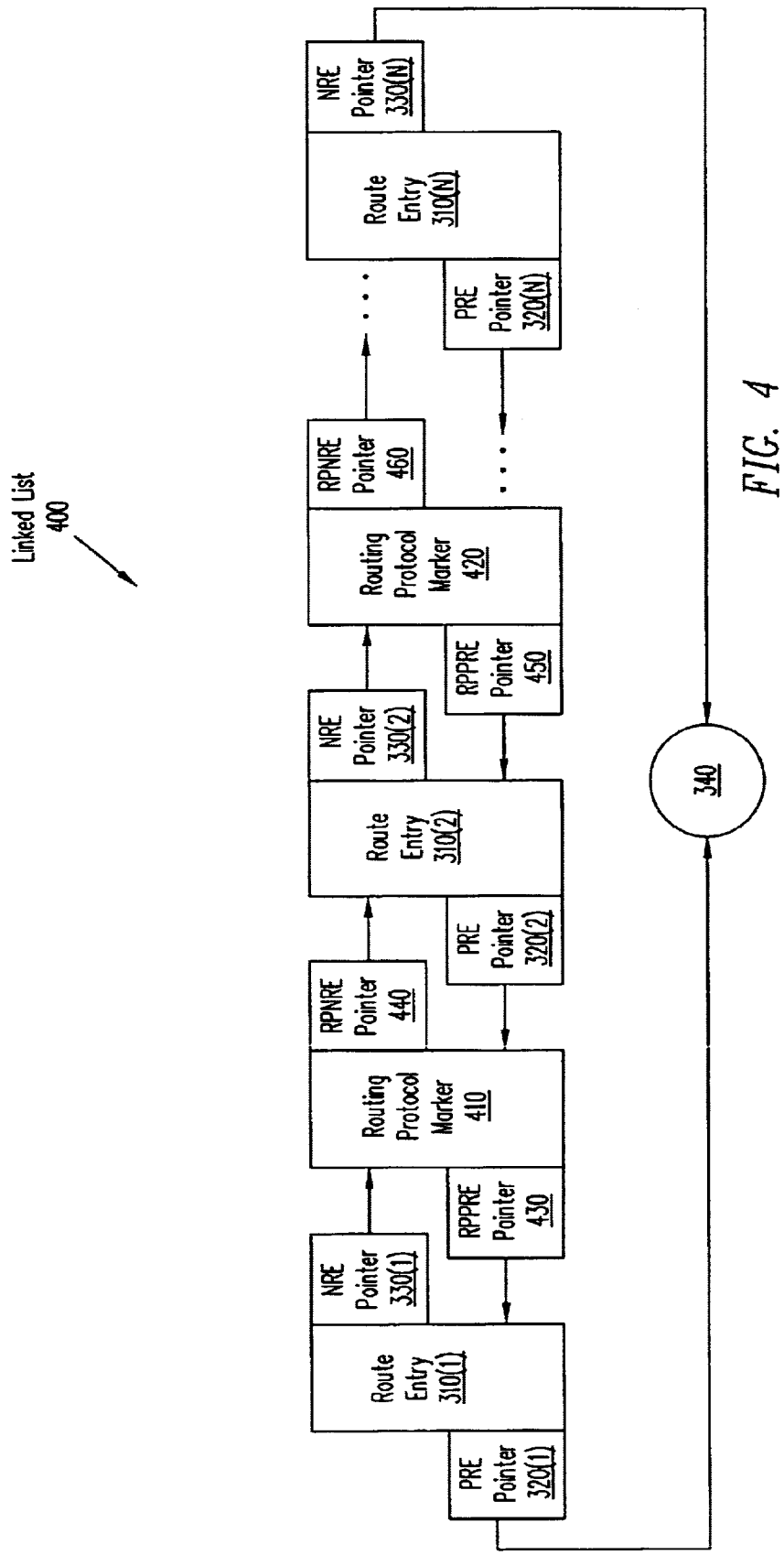
FIG. 4 illustrates a linked list of another embodiment of the present invention.

FIG. 4 illustrates the last of these alternatives. Illustrated in FIG. 4 is a linked list 400 that employs routing protocol markers 410 and 420, among other possible such markers, to indicate the progress within linked list 400 of routing protocols to which those markers correspond. As with such other methods, the routing protocol markers indicate the progress of the corresponding routing protocol in analyzing the route entries of linked list 400. As configured in FIG. 4, routing protocol markers 410 and 420 indicate the progress of their respective routing protocols by delineating between routes having been processed (those route entries to the left of each marker on FIG. 4), and those not yet processed (those route entries to the right of each marker in FIG. 4). Routing protocol marker 410 therefore indicates that its corresponding routing protocol has analyzed route entry 310(1), but has not yet proceeded to analyze route entries 310(2)–(N). In the case of routing protocol marker 420, route entries 310(1)–(2) have been analyzed, while route entries 310(3)–(N) have yet to be analyzed by the routing protocol corresponding to routing protocol marker 420. As noted, routing protocol markers 410 and 420 are substantially similar to route entries 310(1)–(N). Routing protocol marker 410 thus includes a routing protocol PRE pointer 430 (which points at route entry 310(1)) and a routing protocol NRE pointer 440 (which points at route entry 310(2)). Similarly, routing protocol marker 410 includes a routing protocol PRE pointer 450 (which points at route entry 310(2)) and a routing protocol NRE pointer 460 (which points at the next route entry in linked list 400).

Figure 5A:
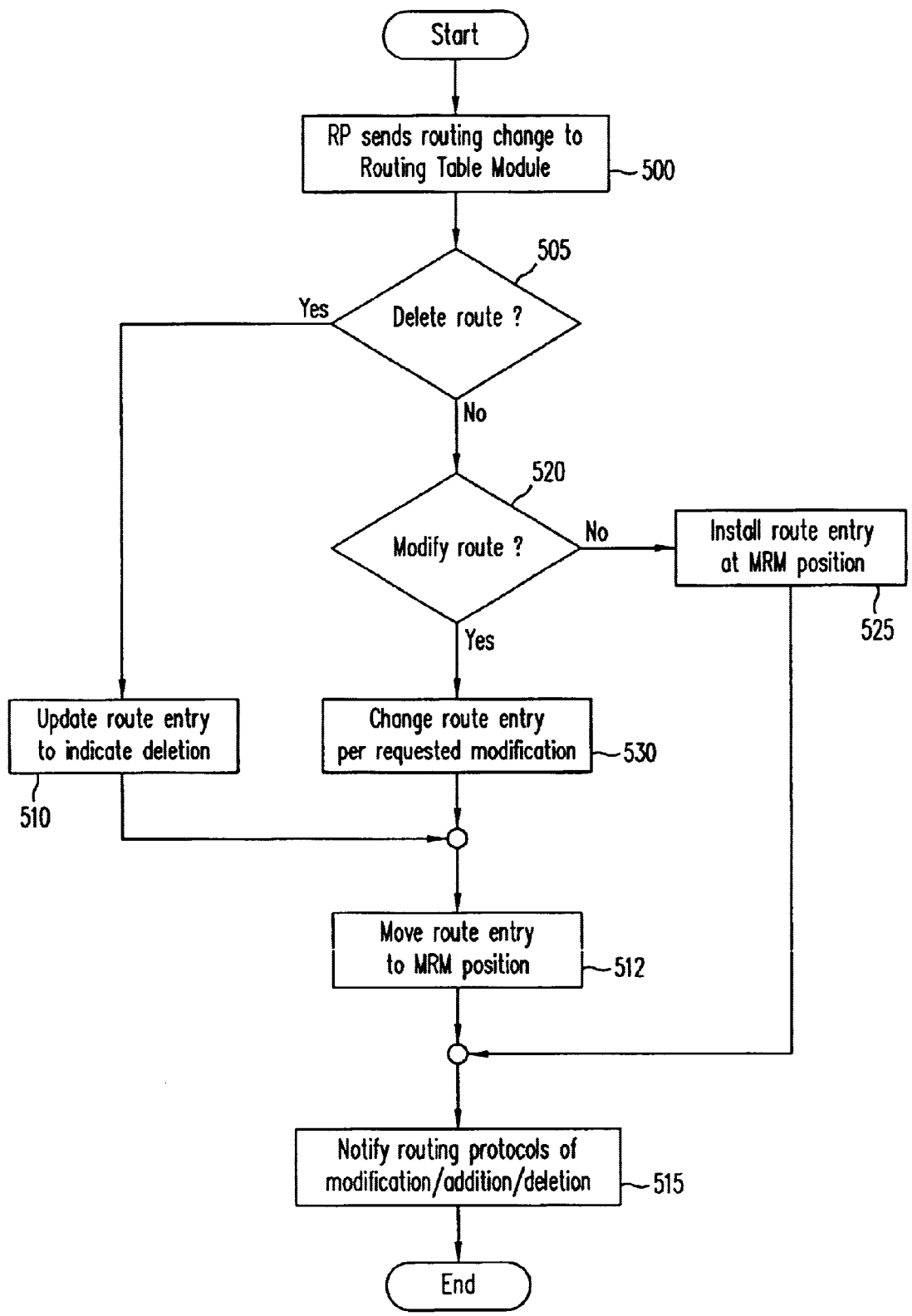
FIGS. 5A and 5B illustrate flow diagrams of actions performed in maintaining linked lists such as are illustrated in FIGS. 3 and 4.

FIG. 5A depicts a flow diagram illustrating one possible set of actions that may be performed in maintaining a linked list such as linked list 300 or linked list 400. As an initial matter, the process begins with one of routing protocols 220(1)–(N) sending a routing change to routing table module 230 in order to effect a change to routing table 240 (step 500). If the change to routing table 240 is a deletion (also referred to herein as a withdrawal) (step 505), the route entry is deleted by updating the route to indicate the deletion (step 510). Next, the route entry being deleted is moved to the MRM position (step 512). One or more of routing protocols 220(1)–(N) are then notified of the deletion (step 515). It will be apparent to one of skill in the art that each of routing protocols 220(1)–(N) may have only a subset of these routing protocols in which there is an interest as to changes in the routes therefor. The action of determining which routing changes are of interest to any one routing protocol is referred to herein as "filtering", and can be implemented in a number of ways.

One way to implement filtering is to apprise routing table module 230 of the need for one (or more) of routing protocols 220(1)–(N) to be notified of changes in routes by one or more of routing protocols 220(1)–(N). This is achieved by properly selecting the notifications sent out by routing table module 230, and so is preferably implemented within routing table module 230. An alternative to this approach is to allow each routing protocol to filter out notifications of interest. This can be accomplished, for example, by sending a notification for every change and simply having the routing protocol skip route entries in the linked list that are not of interest.

If the routing protocol is installing a new route (i.e., installing a route entry into the linked list, also referred to herein as adding a route) (step 520), the new route entry is installed in the linked list, preferably at the most recently modified (MRM) position (step 525). Other of the routing protocols are then notified of this addition (step 515) and may proceed to process the notification of this addition at an appropriate time. If the change to routing table 240 is a modification of a preexisting route (step 520), the appropriate fields of the route entry in question are modified per commands from the corresponding routing protocol (step 530), and the route entry in question is moved to the MRM position (step 512). Again, other of routing protocols 220(1)–(N) are notified of this modification (step 515).

In certain embodiments, two or more of routing protocols 220(1)–(N) may need to add or make changes to a given route. This presents the possibility of conflicts between such routing protocols. Once solution to this potential problem is the assignment of a precedence to each of routing protocols 220(1)–(N) such that one routing protocol will take precedence over another, and so avoid the aforementioned conflict. Such a solution, however, presents a new set of issues to be addressed. For example, in the situation where two or more of routing protocols 220(1)–(N) attempt to add the same route, the question arises as to how best to deal with the unimplemented routing information of lower-precedence routing protocols. One solution would be to simply implement the higher-precedence route and discard the routing information provided by the other routing protocols. Unfortunately, although operable, this solution can lead to a substantial increase in overhead in the situation in which the highest-precedence routing protocol subsequently withdraws the originally implemented route. In that situation, routing table module 230 must then request that all routing protocols having originally attempted to install a route resend that routing information and must also perform another arbitration as to the routing protocols' precedences. Moreover, such a paradigm requires that routing protocols 220(1)–(N) buffer information regarding the unaccepted routes.

Figure 5B:
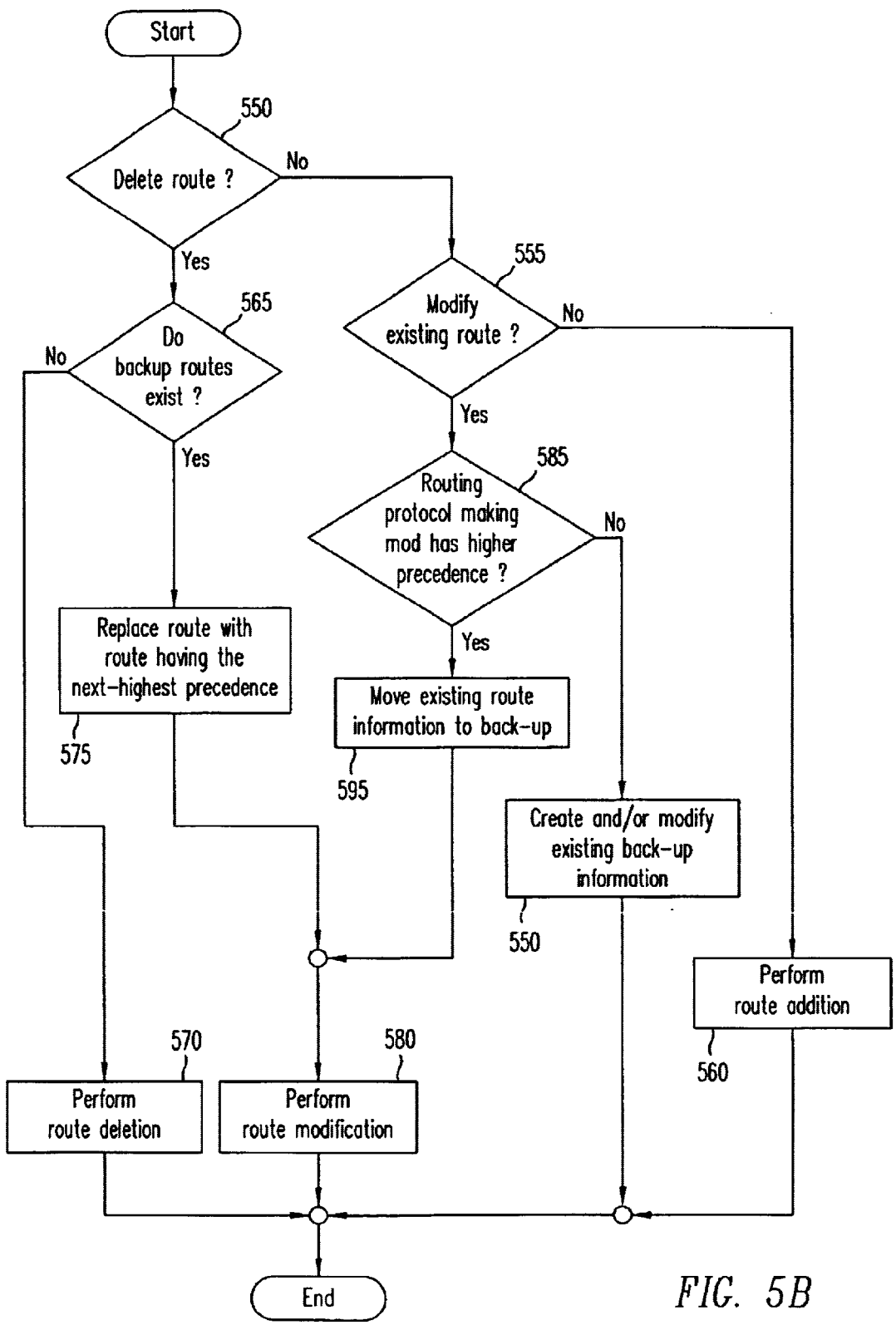

FIG. 5B illustrates one alternative to the above paradigm. The flow diagram of FIG. 5B illustrates the actions performed in an exemplary process for making changes to routing table 240 that takes into account the possibility of conflicting routing changes via the use of precedence values assigned to each of routing protocols 220(1)–(N). In order to facilitate the modification or addition of routes by lower-precedence routing protocols, information is stored regarding such modifications and/or modifications for possible future use in case of a higher-precedence routing protocol's withdrawal of an existing route. The process begins by determining the type of change to be made to routing table 240 (step 550). If the change is an addition (step 555), the routing protocol needing to make an addition to routing table 240 does so (step 560). If the change is a deletion (step 550), a determination is made as to the existence of backup routes (step 565). If no backup routes exist, the routing table module simply performs a route deletion (step 570). If other backup routes exist, the route being deleted is replaced with the route having the next-highest precedence (step 575). This action may, for example, be treated as a route modification, in that the route being replaced may be moved to the MRM position and the information represented thereby altered as defined by the routing information of the next-highest precedence route (step 580).

If the action to be performed is a modification (step 555), a determination is made as to whether the routing protocol making the modification has a higher precedence than the route which last installed/modified the route in question (step 585). If the routing protocol making the modification has a lower precedence than the route which last installed/modified the route in question, existing information regarding this routing protocol's backup route is modified, or if no such backup information currently exists, an appropriate entry is created for the information (step 590). If the routing protocol making the modification has a higher precedence than the route which last installed/modified the route in question, the existing route information is stored as backup route information (step 595). Because the route's information has now changed, a route modification is then performed (step 580).

Thus, the process illustrated in FIG. 5B implements the storage of information regarding routes corresponding to lower-precedence routing protocols in order to avoid the need for buffering large amounts of information and the re-arbitration between routing protocols upon the withdrawal of a higher-precedence route. Preferably, information stored regarding lower-precedence routes is kept to a minimum and can even be reduced to simply storing identifiers corresponding to routing protocol identifiers in precedence order. This allows routing table module 230 to simply make a request of the routing protocol having the next-highest precedence and avoids the need for routing table module 230 to store information regarding the route itself. As before, routing table module 230 can either be configured to delete and then re-install the new route (at the MRM position), or to move the withdrawn route to the MRM position and then modify that route entry.

Each of the blocks of the flow diagrams of FIGS. 5A and 5B, and those depicted in subsequent figures, may be executed by a module (e.g., a software module) or a portion of a module or a computer system user. The methods described herein, the operations thereof and modules for performing such methods may therefore be executed on a computer system configured to execute the operations of the method and/or may be executed from computer-readable media. The method may be embodied in a machine-readable and/or computer-readable medium for configuring a computer system to execute the method. The software modules may be stored within and/or transmitted to a computer system memory to configure the computer system to perform the functions of the module.

Those skilled in the art will also recognize that the boundaries between modules and operations depicted herein are merely illustrative and alternative embodiments may merge such modules or operations, or impose an alternative decomposition of functionality thereon. For example, the actions discussed herein may be decomposed into sub-operations to be executed as multiple computer processes. Moreover, alternative embodiments may combine multiple instances of a particular operation or sub-operation. Furthermore, those skilled in the art will recognize that the operations described in exemplary embodiment are for illustration only. Operations may be combined or the functionality of the operations may be distributed in additional operations in accordance with the invention.

Figure 6:
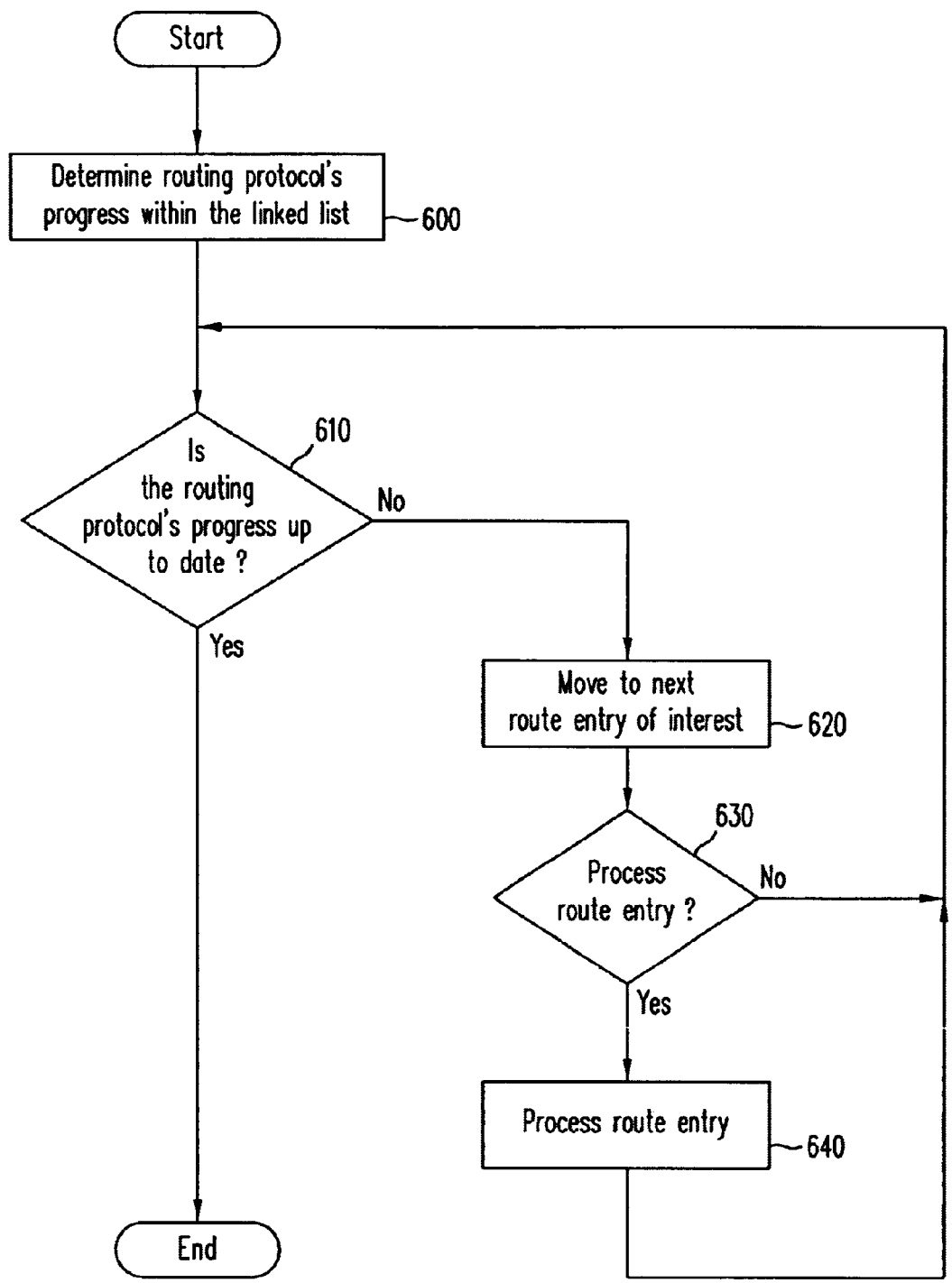
FIG. 6 illustrates the processing performed by a routing protocol receiving notification of a change to a routing table in one embodiment of the present invention.

FIG. 6 illustrates the processing performed by a routing protocol receiving notification of a change, although these actions need not, and likely are not, performed immediately upon the receipt of the notification. While a routing protocol could be configured to analyze entries in the linked list on a per-notification basis, this would likely not be an efficient mechanism to deal with changes in routing table 240. Preferably, a routing protocol allows multiple changes to routing table 240 to occur before analyzing such changes. In effect, such a routing protocol is awakened only when a certain number of routing changes has occurred. The routing protocol then analyzes all the routing changes at once, thus minimizing the overhead associated with calling routines to perform these functions. This analysis of multiple route entries, referred to herein as a "block analysis" approach, is depicted in FIG. 6.

The process begins with the determination of the routing protocol's current progress within the linked list (step 600). The routing protocol's progress is then analyzed to determine if a given number of new or modified route entries of interest have not as yet been analyzed (step 610). This might be tested, for example, by determining (e.g., using pointer values) whether the routing protocol's marker indicated that route entries have been processed up through the MRM position. If the routing protocol's progress indicates that there are further route entries to be analyzed, the routing protocol's marker is moved to the next route entry of interest (step 620). The routing protocol then determines whether the route entry in question is of interest with regard to processing (step 630). Route entries of routes that are not of interest can be skipped. The step of analyzing a route entry with regard to the need for processing is an example of how a routing protocol can be made to perform filtering. In such a scenario, routing table module 230 is not expected to perform filtering, and so it is expected that all notifications are passed to the given routing protocol. If the route entry is to be processed for the given routing protocol (step 630), the route entry is then processed (step 640); otherwise, the routing protocol's progress is examined and the process either continues or exits. Thus, the routing protocol progresses through the linked list by moving from one route entry to the next, determining if that route entry should be processed, and, if so, processing the route entry, with the process completing when the MRM position is reached.

Figure 7:
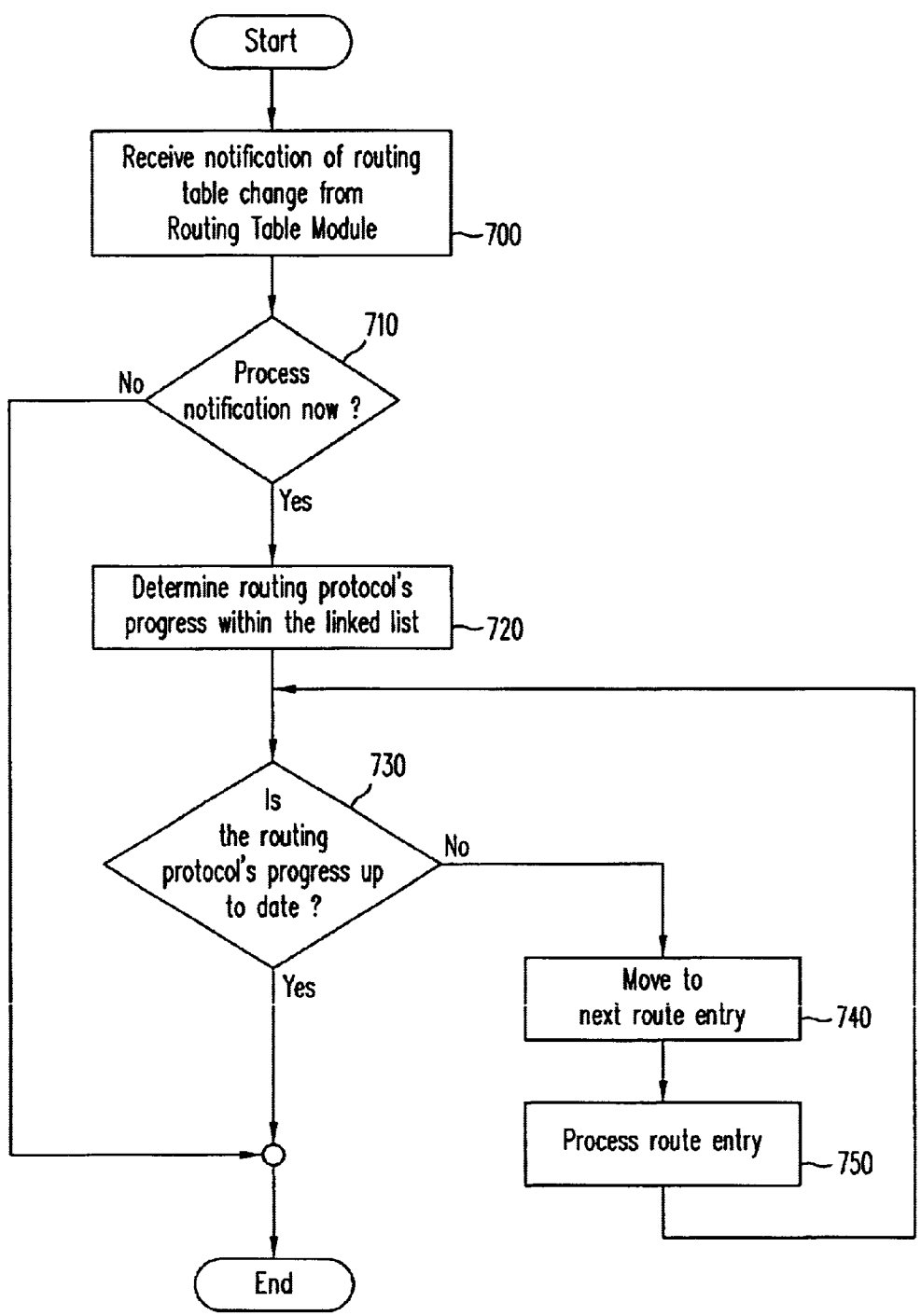
FIG. 7 illustrates an alternative process to that shown in FIG. 6 for such processing according to one embodiment of the present invention.

FIG. 7 illustrates an alternative process to that shown in FIG. 6 for the processing of notifications from a routing table module such as routing table module 230 by a routing protocol. The process begins at step 700, wherein a notification of a routing table change is received from routing table module 230. In the process depicted in FIG. 7, filtering is performed by routing table module 230 on routing table 240 determining if the routing protocol requires notification, and so no filtering need be performed by the routing protocol receiving the notification.

Next, the routing protocol receiving the notification determines whether or not to process the notification received, upon receipt of the notification (step 710). A routing protocol processes each notification upon receipt, indicating to the routing protocol module that the routing protocol is ready to accept another notification. Rather than processing each notification upon receipt, however, it will be noted that better performance can be achieved by allowing multiple notifications to "accumulate" (i.e., remain unprocessed by the routing protocol) and processing the accumulated notifications all at once. Thus, the decision as to when to process the notification is provided in the flow diagram of FIG. 7 to indicate that the routing protocol in question may wait until a later time and then process multiple routing table change. For example, the routing protocol may process routing table changes every fifth notification. The efficiency of processing routing table changes must be balanced against the need by the routing protocol for timely routing information. If the routing table changes are not processed often enough, the routing protocol may operate using stale routing information. Conversely, as noted, if routing table changes are processed too often, excessive overhead may be encountered.

Next, the routing protocol's progress within the linked list is examined (step 720). If the routing protocol's progress is not up to date (step 730), the routing protocol moves to the next route entry in the linked list (step 740), and processes that route entry (step 750). Once the routing protocol's progress is up to date (step 730), the process of updating routing information per changes in routing table 240 is completed.

As will be appreciated by one of skill in the art, the notification mechanism described herein can be generalized to uses other than the redistribution of routes. For example, the notification mechanism described herein can be used to distribute any manner of properties regarding the attributes of a network connection. If a first routing protocol stopped functioning, for example, and in the process took down routes being used by other routing protocols, the other routing protocols can compete for the one or more of the failed route, on the basis of their precedences. In so doing, routing table module 230 sequentially promotes routing protocols to serve as primary protocol for a route based on the routing protocols' precedences.

Figure 8:
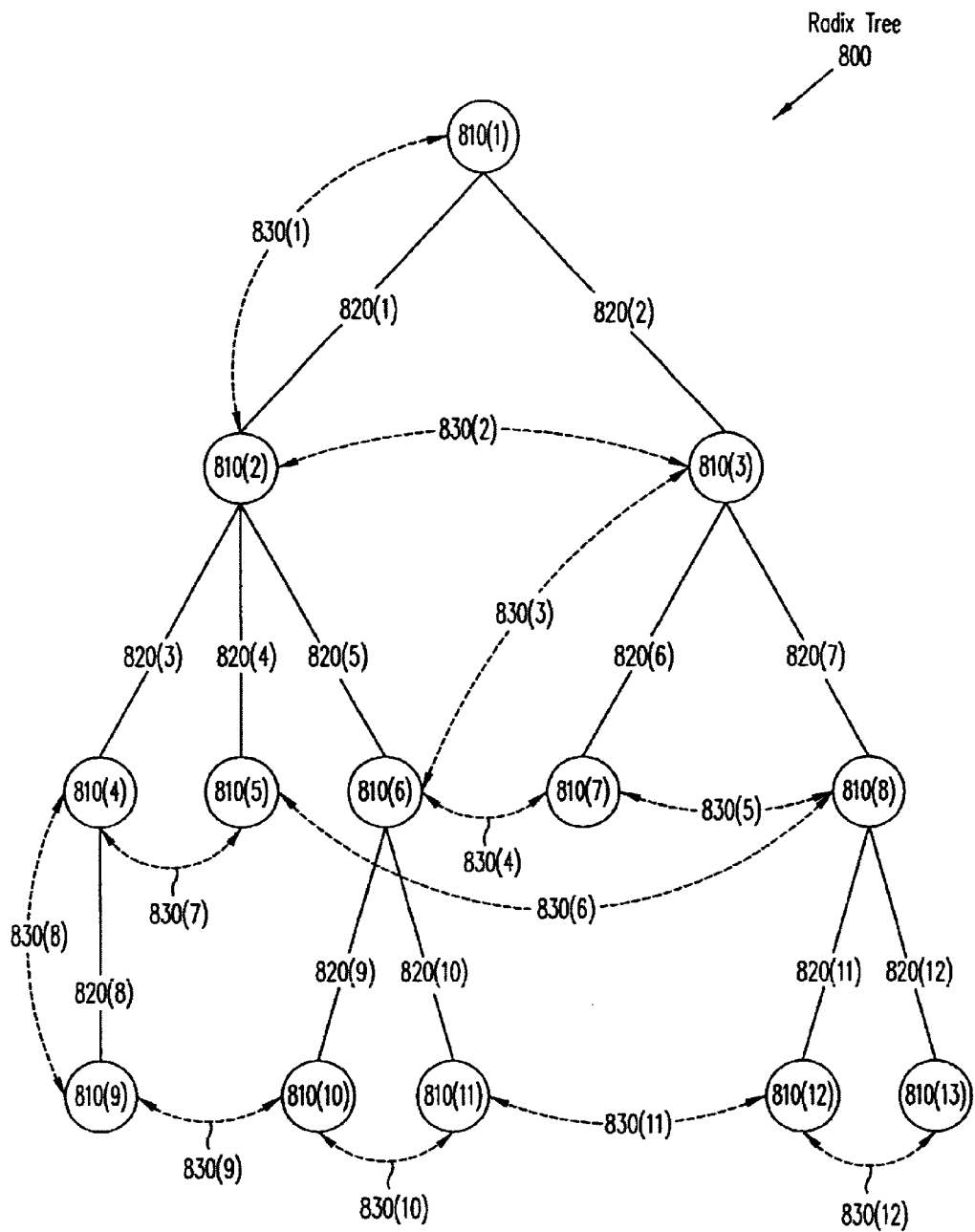
FIG. 8 illustrates a radix tree configured to implement a routing table and a linked list according to one embodiment of the present invention.

FIG. 8 illustrates a radix tree 800 that can be used to implement routing table 240. A radix tree is an m-ary tree in which objects (e.g., routes) can be stored such that those objects are searchable using a key. In a radix tree, a search is performed by working with the bits of a key instead of the entire key. The leading bit determines which branch to take at the first level, the next leading bit determines which branch to take at the second level, and so on until an external node is encountered. The principal advantage of a radix tree over a traditional tree is that it easily accommodates variable-length keys. An advantage of certain embodiments of the present invention is the fact that such a radix tree can be modified to take advantage of the concepts described herein with relative ease.

Shown in FIG. 8 are nodes 810(1)–(13) that make up radix tree 800. As will apparent to one of skill in the art, radix tree 800 merely exemplifies what is a larger set of possible radix trees. The data structure of radix tree 800 is that of an m-ary tree structure which can be implemented, for example, using pointers (represented in FIG. 8 by pointers 820(1)–(12)). As will also be apparent to one of skill in the art, the structural connections represented by pointers 820(1)–(12) may be implemented in a number of ways. The data structures represented by nodes 810(1)–(13) can be modified with relative ease to include the structures necessary to implement the concepts described herein. For example, radix tree 800 is shown in FIG. 8 as having been modified to implement the pointers illustrated in FIG. 3 as PRE pointers 320(1)–(N) and NRE pointers 330(1)–(N). These pointers are illustrated in FIG. 8 as route entry pointers 830(1)–(12), each of which is double-headed to indicate the previous =-and next route entry pointers represented thereby. It will be noted that the numbering of nodes 810(1)–(13), pointers 820(1)–(12), and route entry pointers 830(1)–(12) are depicted in monotonically increasing order. Such a scenario might exist, for example, in the case where nodes 810(1)–(13) had been added in a serial fashion and no modifications of or deletions from radix tree 800 have been performed in this scenario. As will be apparent to one of skill in the art, subsequent modifications, deletions and additions would greatly alter the ordering exhibited in the structures. In fact, large radix trees of routers in operation for extended periods of time can be expected to have radix trees with very little monotonicity. Radix tree 800 can be used to implement routing table 240, as noted, and can also act as the foundation for implementing a linked list such as that shown in FIG. 3. In radix tree 800, routing protocol markers such as those of FIG. 4 are not employed; but instead routing protocol pointers such as those shown in FIG. 3 are used. Using a radix tree structure (e.g., radix tree 800), it will be apparent to one of skill in the art that other implementations of the concepts described herein may be devised with relative ease (e.g., the routing protocol markers of FIG. 4.).

Figure 9:
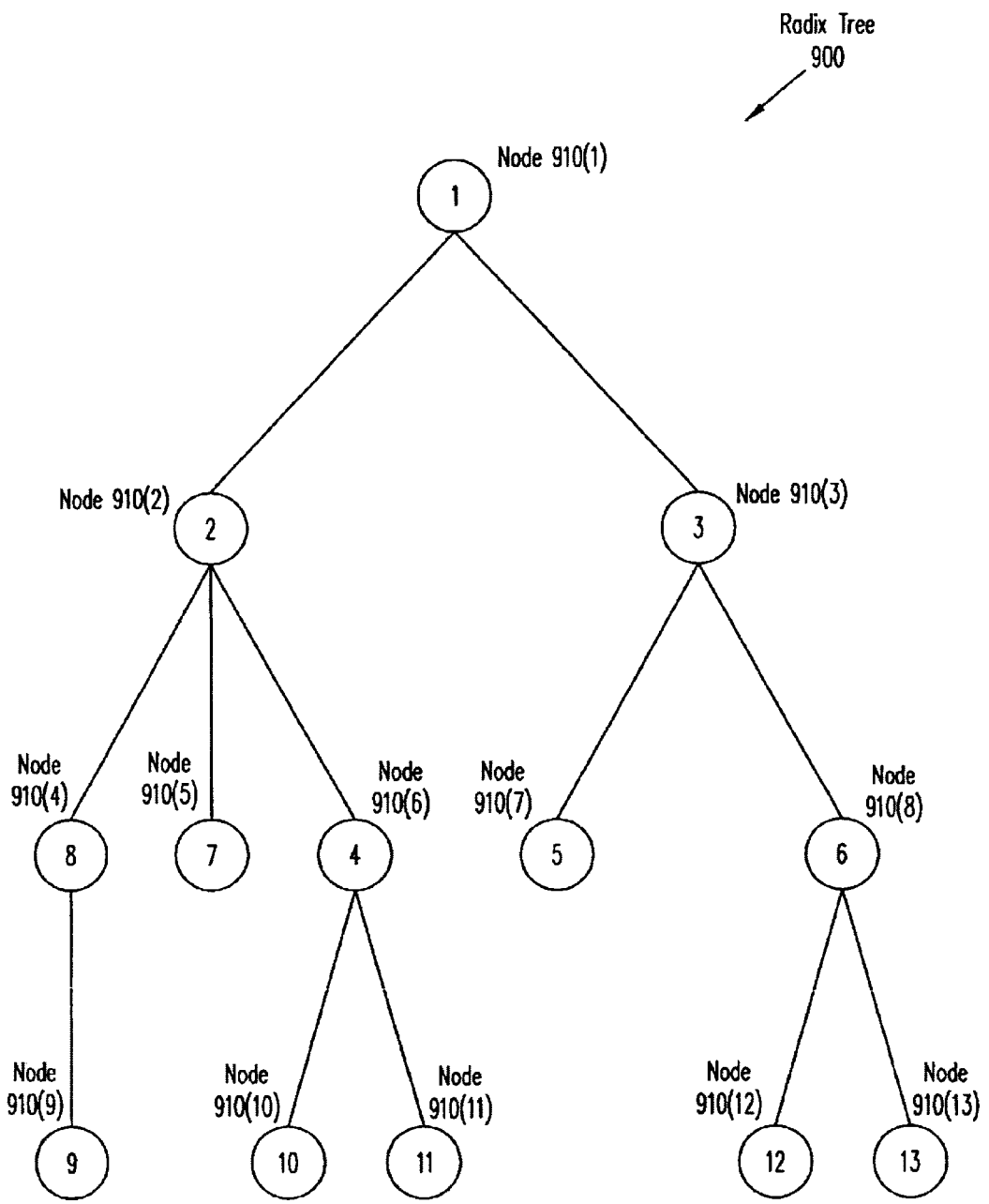
FIG. 9 illustrates a radix tree according to another embodiment of the present invention.

FIG. 9 illustrates a radix tree 900 that employs indexes to allow routing protocols to identify new or modified routes of interest. Radix tree 900 is made up of nodes (exemplified by nodes 910(1)–(13)), as before. It will be noted that the index shown at the center of nodes 910(1)–(13) in FIG. 9 correspond to the order of nodes 810(1)–(13) as delineated by route entry pointers 830(1)–(12) of FIG. 8. As noted, a radix tree allows searching through the use of a key, using only certain bits of a key instead of the entire key. The previous comments regarding monotonicity apply here as well.

Figure 10:
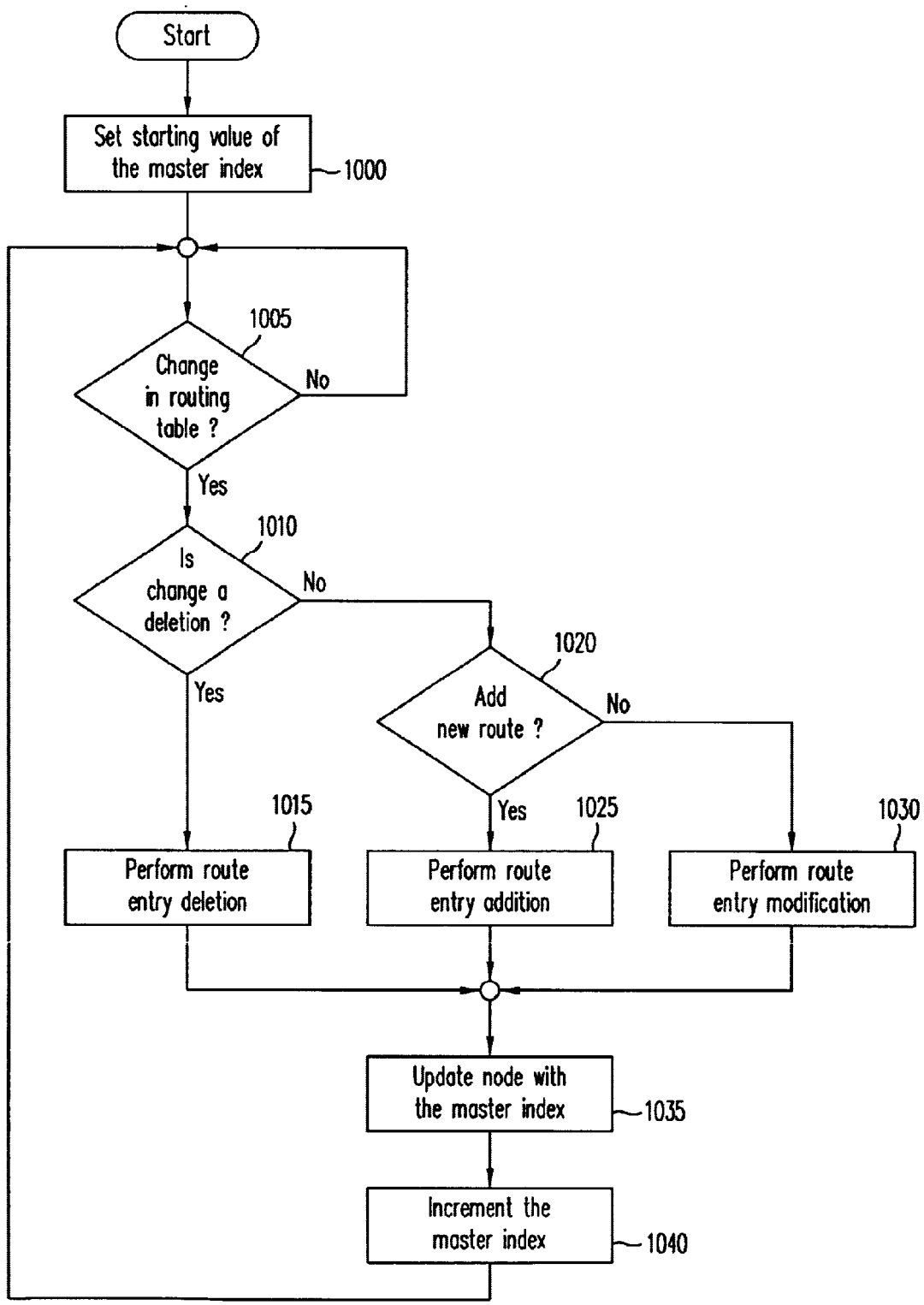
FIG. 10 illustrates the actions performed in generating the indexes show in FIG. 9.

FIG. 10 illustrates the actions performed in generating the indexes shown in FIG. 9. The process of FIG. 10 begins with setting the starting value of the master index (step 1000). In principle, for every addition or modification to radix tree 900 (i.e., routing table 240), the master index is incremented, indicating the addition of a new node or the modification of an existing node (which can be performed as the addition of a new node). The master index is preferably large enough in size to avoid confusion resulting from the master index rolling over to zero. This can be achieved by using a large master index (e.g., 32 or 64 bits), resulting in a very long period of time between rollovers.

Next, the process awaits a change in routing table 240 (step 1005), a change being the addition of a new route, or the deletion or modification of an existing route. If the requested change is a deletion (step 1010) and the deletion is performed (step 1015). If the change is not a deletion (step 1010), a determination is then made as to whether or not the change is the addition of a new route to routing table 240 (step 1020). If the change is the addition of a new route to routing table 240, the route entry is added to routing table 240 (step 1025). Otherwise, the change is a modification to an existing route entry in routing table 240. Such a modification (step 1030) can be effected in a manner such as that previously described. The addition of new routes to routing table 240 and the modification and deletion of existing routes in routing table 240 require that the current node's index be updated (step 1035). Thus, as nodes are added, modified, or deleted, the node's index is set to the current value of the master index in order to indicate the fact of that node's altered status. Once this action is completed, the master index is incremented in order to prepare for the next addition or modification (step 1040).

Figure 11:
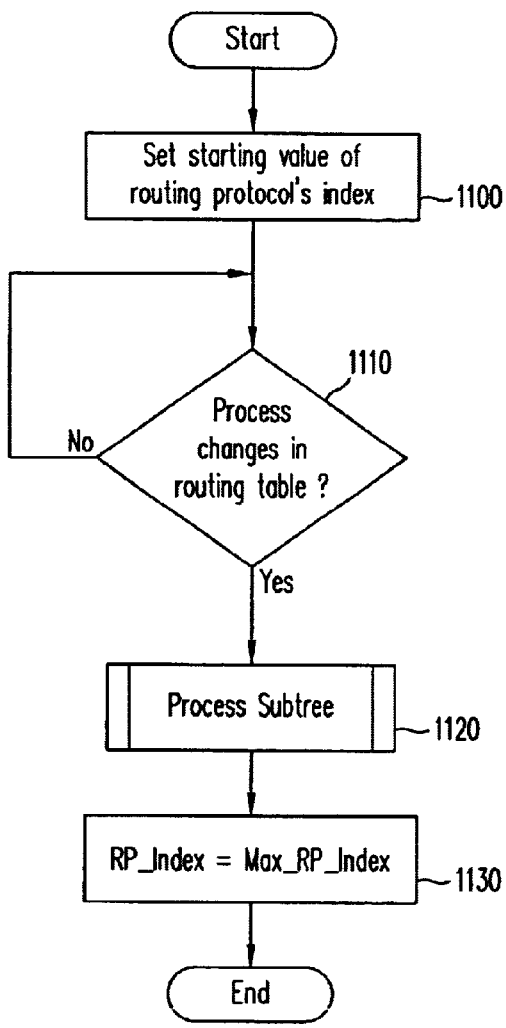
FIG. 11 illustrates an example of a switching process performed by a routing protocol according to one embodiment of the present invention.

FIG. 11 illustrates an example of the searching done by a routing protocol in reviewing routes of interest to that routing protocol stored in a radix tree such as radix tree 900. One method of searching such trees, given their structure, is the use of recursive techniques. As has been noted, the use of alternative data structures for storing the route entries (e.g., a simple linked list) is likely to require the use of different searching paradigms. In updating a routing protocol's route information, the process begins by setting the routing protocol's index to a starting value. The starting value is preferably such that any routes of interest maintained in routing table 240 that are not known to the routing protocol in question are processed on the initial pass of the routing protocol through routing table 240 (step 1100). The process then waits for changes to be made to routing table 240 (step 1110). As will be apparent to one of skill in the art, the processes depicted herein are designed to run as one of several threads in a multi-threaded operating system, such as that illustrated in FIG. 2 as router operating system 220. Once a change in routing table 240 is detected (or a sufficient number of such changes have occurred), a sub-process is executed to analyze radix tree 900 for changes therein (step 1120). This process is designated in FIG. 11 as "Process Subtree". This process is so designated in order to effect the illustration of that process as being recursive in nature. Once radix tree 900 has been analyzed, the routing protocol's index is set to the maximum index encountered in radix tree 900 (step 1130). In effect, this action sets the routing protocol's index to a value indicating that the routing protocol is current with regard to any changes that have been made to routing table 240 up to that point in time.

Figure 12:
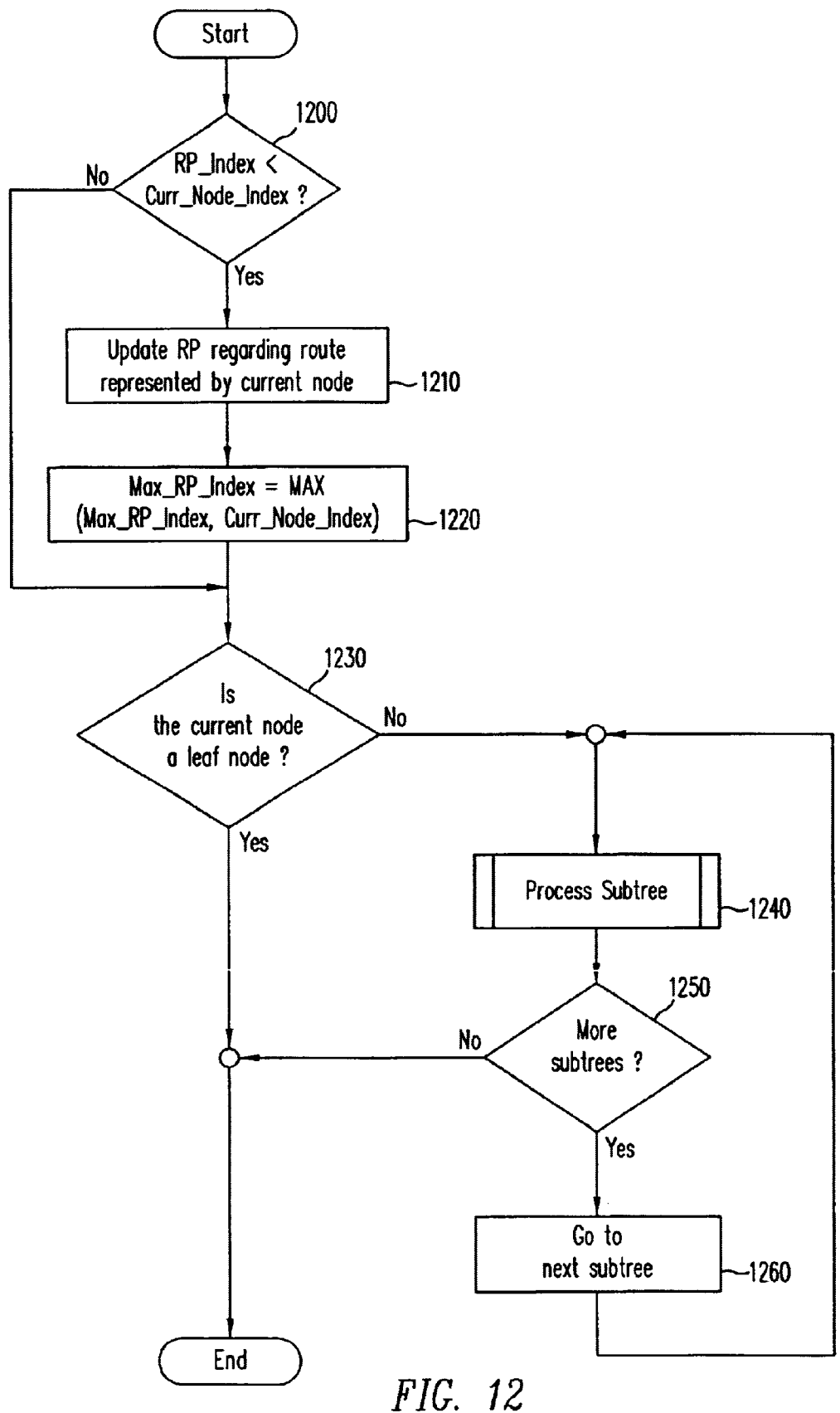
FIG. 12 illustrates an example of a recursive process that can be used to traverse a radix tree configured according to one embodiment of the present invention.

FIG. 12 illustrates an example of a recursive process that can be used to traverse radix tree 900, and thereby analyze changes in radix tree 900. The process begins by determining if a routing protocol's index ($RP_{13}Index$) is less than the index of the current node being analyzed ($Curr_{13}Node_{13}Index$) (step 1200). If the routing protocol's index is indeed less than the index of the current node, the routing protocol is updated with regarding to the route represented by the current node (step 1210). The maximum index is also set to the greater of the maximum index or the index of the current node (step 1220). Next, a determination is made as to whether or not the current node is a leaf node (step 1230). If the current node is a leaf node, this iteration of Process Subtree is at an end. If the current node is not a leaf node, Process Subtree is again executed (step 1240) in order to process the subtree(s) of the current node. Upon returning from this iteration of Process Subtree, the process then determines if more subtrees await processing (step 1250). If all subtrees of the current node have been processed, this iteration of Process Subtree exits. If further subtrees remain to be processed, the process proceeds to the next subtree (step 1260) and processes that subtree using Process Subtree (step 1240). These iterations continue until no more subtrees remain to be processed (step 1250). By using the iterative method illustrated in FIG. 12, nodes are analyzed and the routing protocol in question updated as the nodes are traversed. For large radix trees, however, a complete search can be needlessly time consuming. As with many applications that employ m-ary trees, heuristics may be employed to reduce the number of nodes that need to be analyzed. Such heuristics are referred to as "pruning heuristics".

Figure 13:
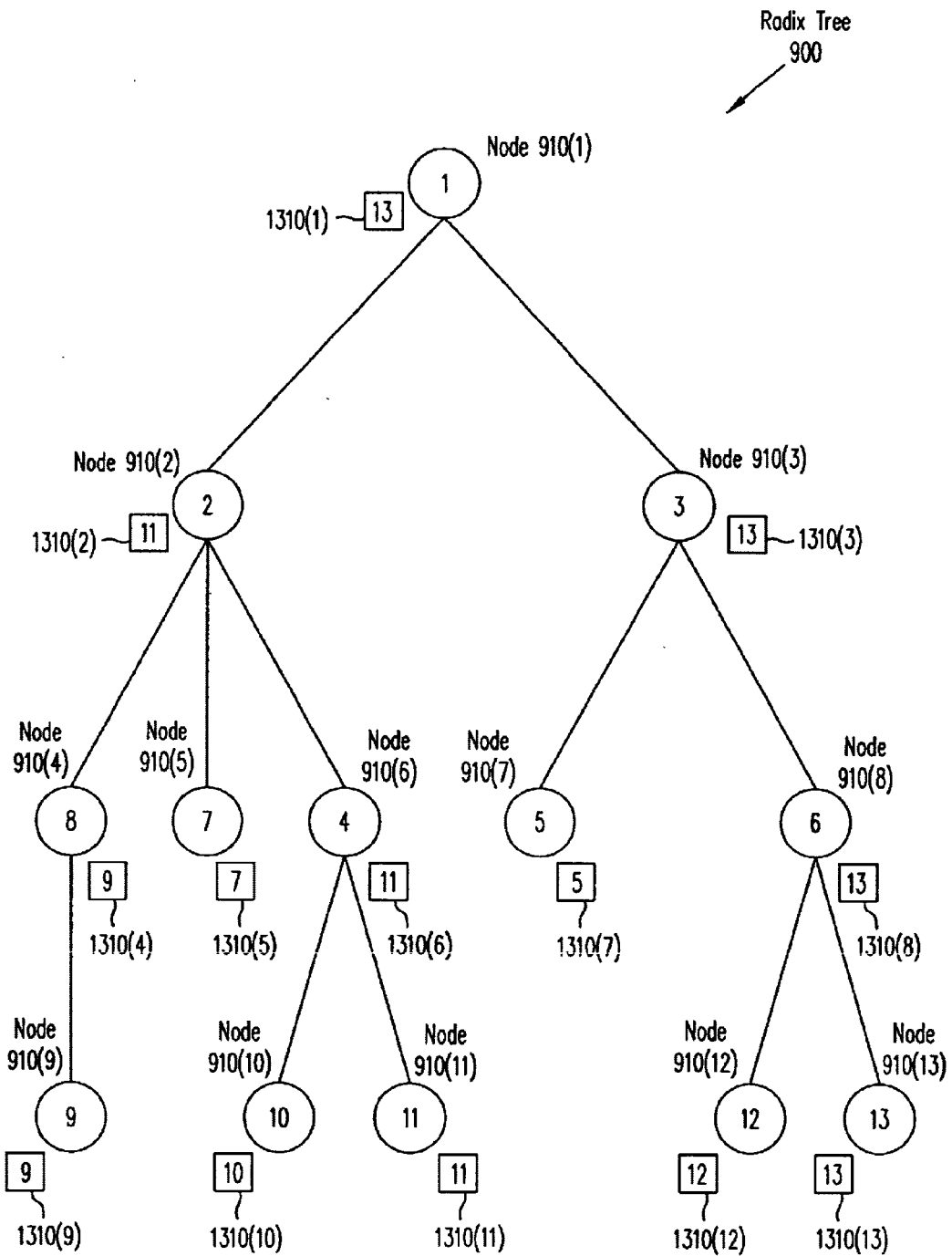
FIG. 13 illustrates a radix tree according to yet another embodiment of the present invention.

FIG. 13 illustrates radix tree 900 configured to take advantage of one such method. As before, radix tree 900 includes nodes 910 (1)–(13) indexed according to the sequence designated in FIG. 8 by route entry pointers 830(1)–(12). However, in the configuration shown in FIG. 13, each of nodes 910(1)–(13) is associated with a corresponding one of alternate current node indices 1310(1)–(13). The significance of alternate current node indexes 1310(1)–(13) is that each node's alternate current node index reflects the highest node index among the given node and all nodes below that node in the given subtree. In effect, the largest index from each subtree is "pushed up" through the subtree to the root node of that subtree, and held in that root node's alternate current node index. The effect of using alternate current node indices 1310 (1)–(13) is to alleviate the need for a routing protocol to search through a subtree in which the subtree's root node has an alternate current node index less than the routing protocol's current index. As will be appreciated, if it is assumed that all indices less than or equal to the routing protocol's current index are known to that routing protocol, there is no need for the routing protocol to search a subtree having no index therein greater than the routing protocol's current index. One method of configuring radix tree 900, as depicted in FIG. 13, is illustrated in the flow diagrams shown in FIGS. 14 and 15.

Figure 14:
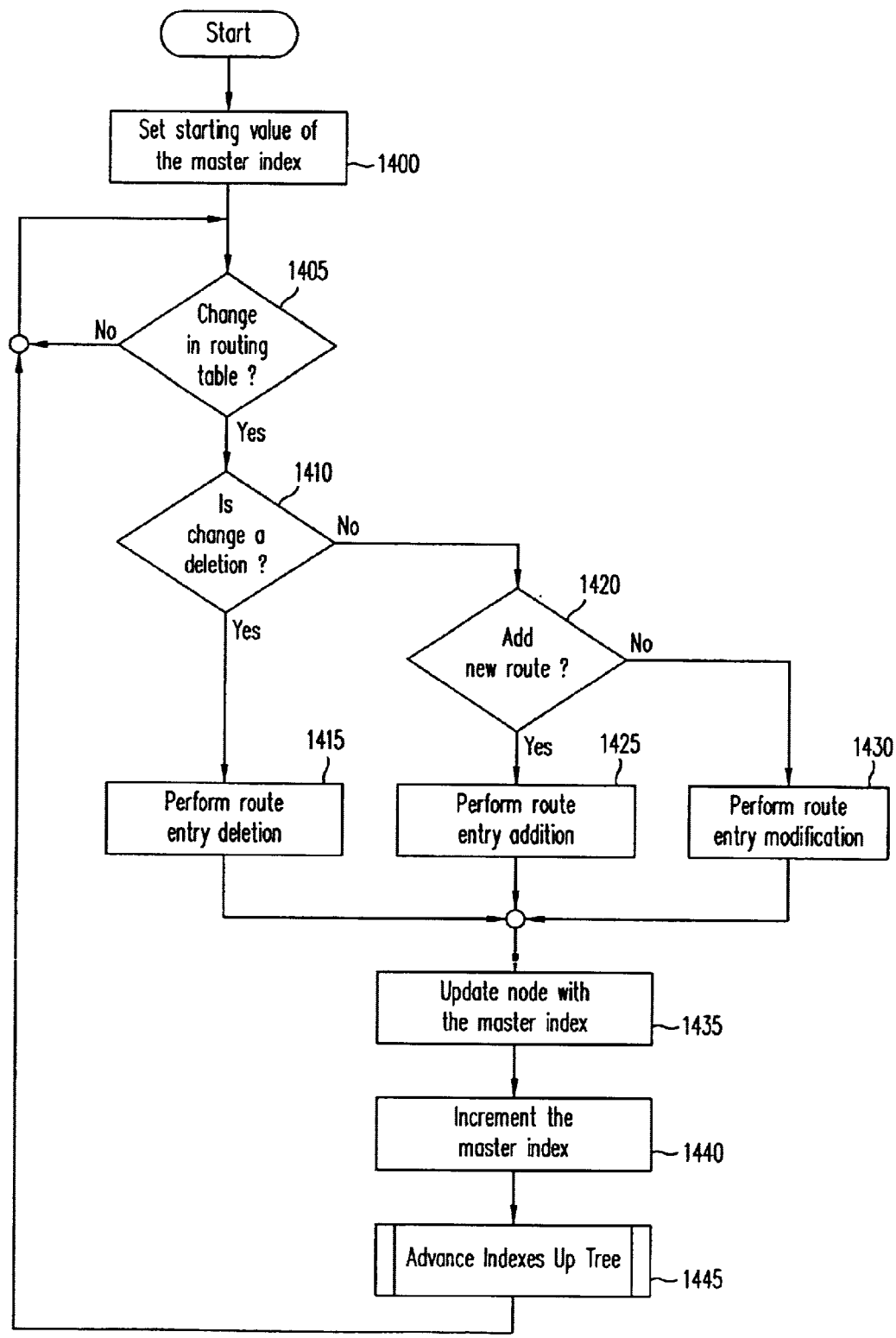
FIG. 14 illustrates an exemplary process for configuring the radix tree of FIG. 13.

FIG. 14 illustrates a process for configuring radix tree 900 that is not unlike the process depicted in FIG. 10. As before, the process begins by setting the master index to some minimal starting value (step 1400). The process then waits for a change to be made to routing table 240 (step 1405). As before, the process depicted in FIG. 14 assumes a multi-threaded environment, as evidenced by threads executing the process of FIG. 14 simply waiting for a change by looping (as shown in FIG. 14), by blocking or by some other method. The process of FIG. 14 could also be implemented in a single-threaded environment simply by only calling the process when routing information for a given routing protocol was known to have changed and not providing a wait loop. Blocking can also be employed.

Once a change in routing table 240 is detected, the type of change is examined to determine how to proceed. If the change is a deletion (step 1410), the requested deletion is performed (step 1415). If the change is not a deletion, it is then ascertained whether a new route has been added to routing table 240 (step 1420). If a new route is to be added to routing table 240, a route entry addition is performed (step 1425); otherwise, the change is a modification of an existing route in routing table 240, and a route entry modification is performed (step 1430). Regardless of the operation performed, the affected node is then updated with the current value of the master index (step 1435). The master index is then incremented in preparation for the next change to routing table 240 (step 1440). In a departure from the process shown in FIG. 10, the process of FIG. 14 then performs the subprocess "Advance Indexes Up Tree" (step 1445) in order to push each subtree's largest index up to that subtree's root node for the purposes described previously, and described in detail subsequently.

Figure 15:
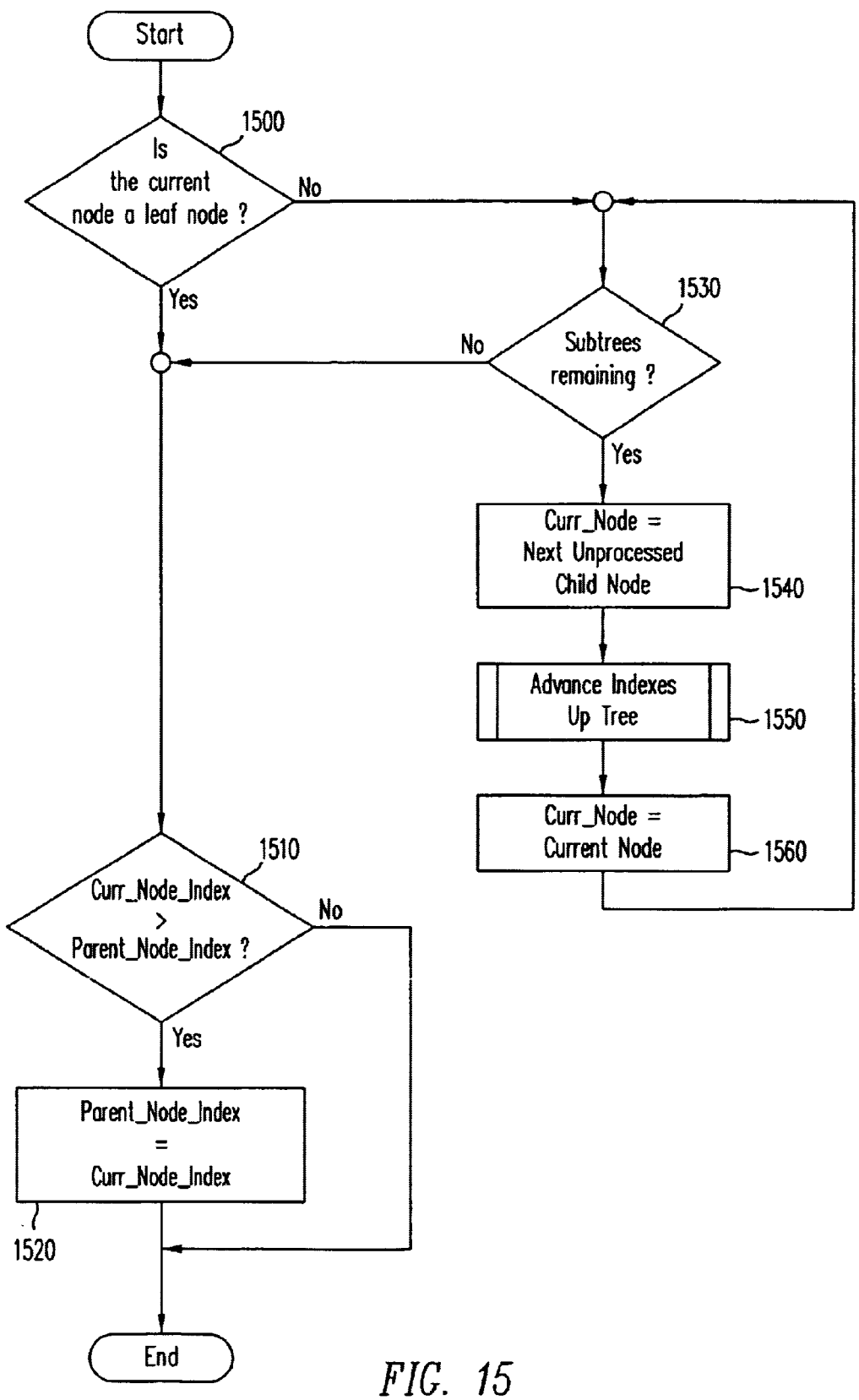
FIG. 15 illustrates an exemplary recursive sub-process according to one embodiment of the present invention.

FIG. 15 illustrates an example of actions that may be performed in effecting the recursive subprocess Advance Indexes Up Tree in order to push indexes up radix tree 900 using alternate current node indices 1310(1)–(N). The process begins by determining whether or not the current node is a leaf node (step 1500). The simplest case is where the search has traversed radix tree 900 down to a leaf node (e.g., one of nodes 910(9)–(13)) of FIG. 13. If this is the case, a determination is made as to whether or not the value of the current (leaf) node's index should be "pushed up" to that node's parent node. This is done by determining whether the current node's index ($Curr_{13}Node_{13}Index$) is greater than the node index of the current node's parent node ($Parent_{13}Node_{13}Index$) (step 1510). If the current node's index is not greater than the parent node's index, the current iteration of Advance Indexes Up Tree is exited. However, if the current node's index is greater than the parent node's index, the parent node's index is set to the current node's index (step 1520).

If the current node is not a leaf node (step 1500), the process recursively descends the subtree of which the current node is the route node. In recursively descending through a radix tree such as radix tree 900, the process determines whether any subtrees remain to be analyzed (step 1530). If subtrees of the current node remain to be analyzed, the current node ($Curr_{13}Node$) is set to the next unprocessed child node of the erstwhile current node (step 1540). Advance Indexes Up Tree is then performed in a recursion that analyzes the unprocessed child node, as well as possibly analyzing one or more subtrees of that child node (step 1550). Upon returning from that recursion of Advance Indexes Up Tree, the erstwhile current node is restored to its original current node status (step 1560) and the process again determines if any of the current node's subtree remain to be analyzed (step 1530). If no further subtrees require analysis, this indicates that indexes from the nodes of the subtrees of the current node have passed their index values up to the current node, and that the current node's alternate current note index reflects this. As a final step in the recursion, the index of the current node, if greater than that of the current node's parent node for storage in the parent node's alternate current node index (step 1510), is passed up to that parent node (step 1520). Thus, in a recursive manner, each node passes the highest index of the nodes below it up to the next node, until each alternate current node index contains the proper value. By examining alternate current node indices, a routing protocol may thereby decide which subtrees in a radix tree require processing and which do not.

Figure 16:
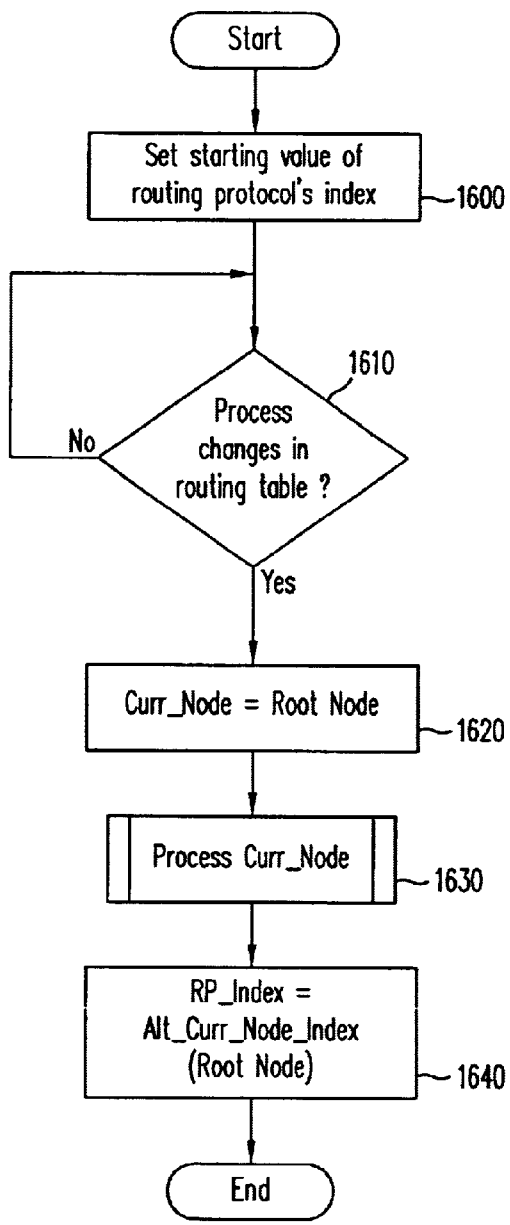
FIG. 16 illustrates an exemplary process performed by a routing protocol to analyze routes stored in the radix tree of FIG. 13.

FIG. 16 illustrates an exemplary process which may be used by routing protocol to analyze routes stored in a routing table using a data structure such as radix tree 900. The process begins by setting the routing protocol's index to a minimal starting value in order to ensure that routes of interest are processed initially (step 1600). Next, the process awaits a change in routing table 240 (step 1610). Upon a change in routing table 240, the process begins the analysis of radix tree 900 by starting with the route node of radix tree 900 (i.e., node 910(1)) (step 1620). The process does so by designating the route node as the current node ($Curr_{13}Node$) (step 1620). The process then performs the recursive process "Process $Curr_{13}Node$" to selectively descend radix tree 900 (step 1630). Upon returning from Process $Curr_{13}Node$, the routing protocol's index is set to the route node's alternate current node index (step 1640).

Figure 17:
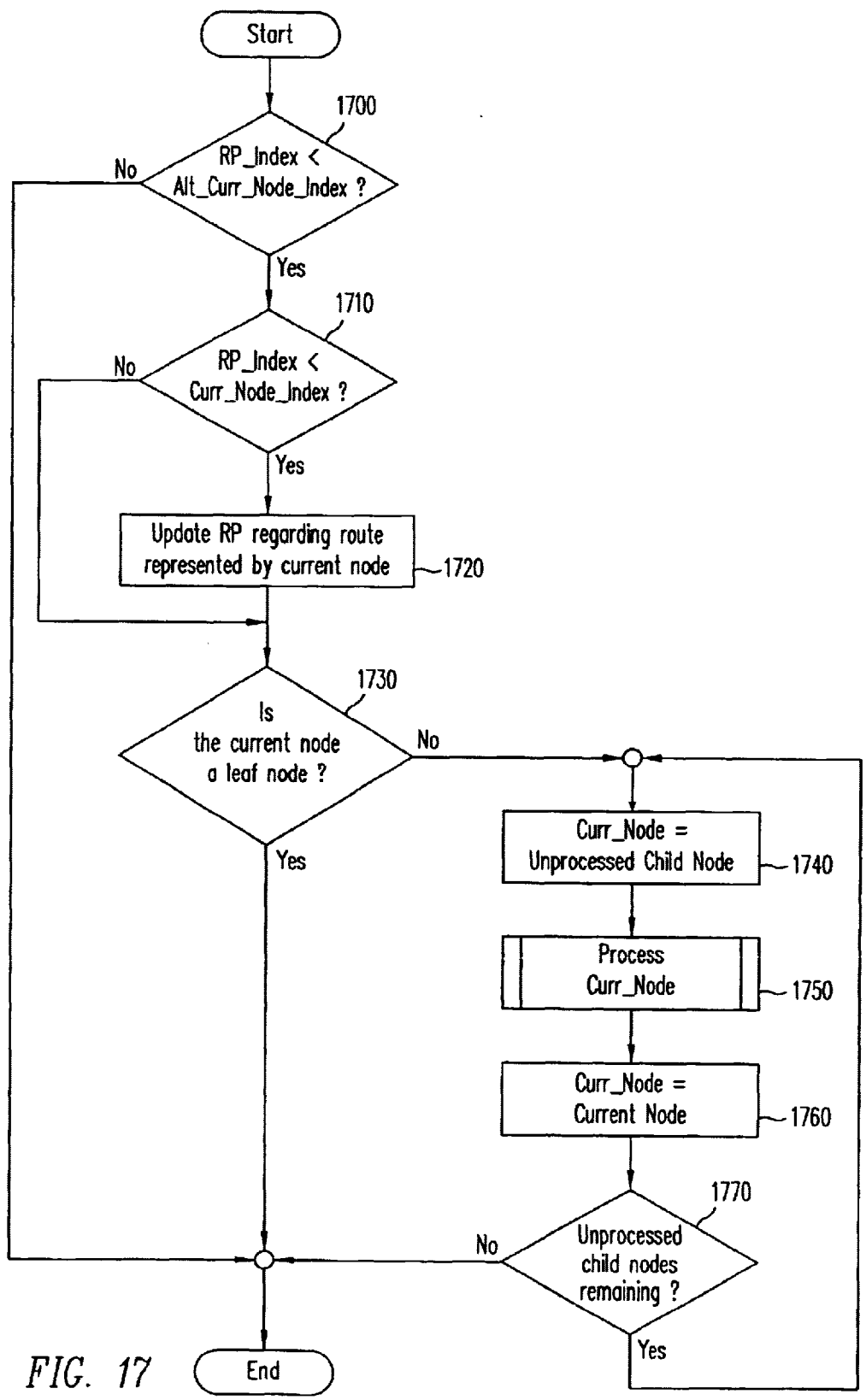
FIG. 17 illustrates a flow diagram of the recursive process employed in processing sub-trees according to one embodiment of the present invention.

FIG. 17 illustrates a flow diagram showing the actions performed in the recursive process Process $Curr_{13}Node$. As depicted in FIG. 17, a determination is first made as to whether the current subtree should be analyzed by comparing the routing protocol's index to the alternate current node index of the current node (step 1700). If the routing protocol's index is currently less than the alternate current node index of the current node, this indicates that there are no nodes in the subtree of the current node that have not already been processed by the routing protocol in question. Thus, by skipping this subtree, performance can be improved. In terms of heuristics, the effect of skipping the current node's subtree is to prune that subtree from the portions of radix tree 900 that are actually examined. If the routing protocol's index is equal to or greater than the alternate current node index of the current node (indicating that the subtree contains at least one node with an index equal to or greater than that of the routing protocol), the process compares the routing protocol's index with the index of the current node (step 1710). If the routing protocol's index is less than the index of the current node, this indicates that the route represented by the current node has not yet been processed by the routing protocol in question, and, assuming that this route is of interest to the routing protocol in question, the route is processed by the routing protocol (step 1720). Otherwise, the routing protocol ignores this route. In either case, the process then determines whether the current node a leaf node (step 1730).

Given the (potential) proceeding analysis, if the current node is a leaf node, nothing further remains to be done and so the current recursion of Process $Curr_{13}Node$ exits. If the current node is not a leaf node, and so it may therefore be assumed that the current node is a root node of a subtree, preparation is made to call yet another recursion of Process $Curr_{13}Node$. Next, an unprocessed child node of the current node is designated as the current node ($Curr_{13}Node=$ Unprocessed Child Node) (step 1740). Process $Curr_{13}Node$ is then performed once again (step 1750). Upon return from Process $Curr_{13}Node$, the erstwhile current node is designated as the current node ($Curr_{13}Node=Current Node$) (step 1760). A determination is then made as to whether any more unprocessed child nodes of the current node remain (step 1770). If there are no more unprocessed child nodes, the current recursion of Process Curr$_{13}$Node exits. Otherwise, the unprocessed child nodes are recursively analyzed in the fashion previously described. Thus, the routing protocol uses the processes illustrated in FIGS. 16 and 17 to recursively descend a radix tree such as radix tree 900 in a selective fashion, analyzing only the subtrees which contain nodes representing routes of interest that are not, as yet, analyzed.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of distributing route information comprising:
    maintaining a plurality of entries, wherein:
        said plurality of entries is a plurality of route entries, and
        each one of said plurality of route entries corresponds to a route in a network;
    indicating an entry of said plurality of entries requiring processing by a first process has been processed by said first process, said indicating comprises maintaining a marker configured to indicate which of said plurality of route entries requiring processing by said first process have not been processed by said first process, said marker corresponding to said first process, wherein said marker is configured to store an index;
    storing said plurality of route entries as nodes in a radix tree;
    incrementing a master index upon performing an addition operation or a modification operation, said addition operation adding a new route entry to said plurality of route entries and said modification operation modifying a one of said plurality of route entries;
    storing said master index in a node index of said new route entry, if an addition operation is performed;
    storing said master index in a node index of said one of said plurality of route entries, if a modification operation is performed; and
    causing said first process to process another of said plurality of entries requiring processing by said first process based on said indication.

2. The method of claim 1, further comprising:
    comparing said index with a node index of each one of said plurality of route entries by traversing said radix tree; and
    processing said each one of said plurality of route entries, if said index is less than said node index of said each one of said plurality of route entries.

3. The method of claim 1, further comprising:
    storing a node index of each leaf node in said radix tree in an alternate index of said each leaf node;
    storing a highest alternate node index in an alternate node index of a non-leaf node of said radix tree, wherein said highest alternate node index is a maximum value of a node index of said non-leaf node and an alternate node index of any child node of said non-leaf node; and
    for each one of said nodes requiring processing by said first process, said each one of said nodes requiring processing by said first process having an alternate node index greater than said index, comparing a node index of said each one of said nodes requiring processing by said first process to said index, and
    if said node index of said each one of said nodes requiring processing by said first process is greater than said index, processing said each one of said nodes requiring processing by said first process.

4. A computer program product encoded in computer readable media, the computer program product comprising:
    a first set of instructions, executable by a processor and configured to cause said processor to maintain a plurality of entries, wherein said plurality of entries is a plurality of route entries, and each one of said plurality of route entries corresponds to a route in a network;
    a second set of instructions, executable on said processor and configured to cause said processor to indicate an entry of said plurality of entries requiring processing by a first process has been processed by said first process, wherein said second set of instructions comprises a third set of instructions, executable on said processor and configured to cause said processor to maintain a marker configured to indicate which of said plurality of route entries requiring processing by said first process have not been processed by said first process, said marker corresponding to said first process, wherein said marker is configured to store an index;
    a fourth set of instructions, executable on said processor and configured to cause said processor to cause said first process to process another of said plurality of entries requiring processing by said first process based on said indication;
    a fifth set of instructions, executable on said processor and configured to cause said processor to increment a master index upon performing an addition operation or a modification operation, said addition operation adding a new route entry to said plurality of route entries and said modification operation modifying a one of said plurality of route entries;
    a sixth set of instructions, executable on said processor and configured to cause said processor to store said master index in a node index of said new route entry, if an addition operation is performed;
    an seventh set of instructions, executable on said processor and configured to cause said processor to store said master index in a node index of said one of said plurality of route entries, if a modification operation is performed; and
    an eight set of instructions, executable on said processor and configured to cause said processor to store said plurality of route entries as nodes in a radix tree.

5. The computer program product of claim 4, further comprising:
    a ninth set of instructions, executable on said processor and configured to cause said processor to compare said index with a node index of each one of said plurality of route entries by traversing said radix tree; and
    a tenth set of instructions, executable on said processor and configured to cause said processor to process said each one of said plurality of route entries, if said index is less than said node index of said each one of said plurality of route entries.

6. The computer program product of claim 4, further comprising:
    a ninth set of instructions, executable on said processor and configured to cause said processor to store a node index of each leaf node in said radix tree in an alternate index of said each leaf node;

a tenth set of instructions, executable on said processor and configured to cause said processor to store a highest alternate node index in an alternate node index of a non-leaf node of said radix tree, wherein said highest alternate node index is a maximum value of a node index of said non-leaf node and an alternate node index of any child node of said non-leaf node; and an eleventh set of instructions, executable on said processor and configured to cause said processor to, for each one of said nodes requiring processing by said first process, said each one of said nodes requiring processing by said first process having an alternate node index greater than said index, compare a node index of said each one of said nodes requiring processing by said first process to said index, and if said node index of said each one of said nodes requiring processing by said first process is greater than said index, cause said first process to process said each one of said nodes requiring processing by said first process.

7. A method of distributing route information comprising:

maintaining a plurality of entries, wherein
said plurality of entries is a plurality of route entries, each one of said plurality of route entries corresponds to a route in a network, and
said plurality of entries comprises a routing table;

indicating an entry of said plurality of entries requiring processing by a first process has been processed by said first process;

detecting a change made to said routing table by a second process;

notifying said first process of said change;

updating a marker corresponding to said first process, said marker indicating which of said plurality of entries requiring processing by said first process have been processed by said first process; and causing said first process to process another of said plurality of entries requiring processing by said first process based on said indication.

8. The method of claim 7, further comprising:

storing said plurality of route entries in a linked list.

9. The method of claim 8, wherein said marker is a pointer, further comprising:

causing said marker to point to a current route entry of said plurality of route entries, said current route entry and ones of said plurality of route entries previous to said current route entry in said linked list having been processed by said first process.

10. The method of claim 8, wherein said marker is an entry in said linked list, further comprising:

positioning said marker in said linked list after a current route entry of said plurality of route entries, said current route entry and ones of said plurality of route entries previous to said current route entry in said linked list having been processed by said first process.

11. A computer program product encoded in computer readable media, the computer program product comprising:

a first set of instructions, executable by a processor and configured to cause said processor to maintain a plurality of entries, wherein
said plurality of entries is a plurality of route entries, each one of said plurality of route entries corresponds to a route in a network, and
said plurality of entries comprises a routing table;

a second set of instructions, executable on said processor and configured to cause said processor to indicate an entry of said plurality of entries requiring processing by a first process has been processed by said first process;

a third set of instructions, executable on said processor and configured to cause said processor to detect a change made to said routing table by a second process;

a fourth set of instructions, executable on said processor and configured to cause said processor to notify said first process of said change; and a fifth set of instructions, executable on said processor and configured to cause said processor to update a marker corresponding to said first process, said marker indicating which of said plurality of entries requiring processing by said first process have been processed by said first process a sixth set of instructions, executable on said processor and configured to cause said processor to cause said first process to process another of said plurality of entries requiring processing by said first process based on said indication.

12. The computer program product of claim 11, wherein said marker is a pointer, further comprising:

a fifth set of instructions, executable on said processor and configured to cause said processor to store said plurality of route entries in a linked list; and a sixth set of instructions, executable on said processor and configured to cause said processor to cause said marker to point to a current route entry of said plurality of route entries, said current route entry and ones of said plurality of route entries previous to said current route entry in said linked list having been processed by said first process.

13. The computer program product of claim 11, wherein said marker is an entry in said linked list, further comprising:

a fifth set of instructions, executable on said processor and configured to cause said processor to store said plurality of route entries in a linked list; and a sixth set of instructions, executable on said processor and configured to cause said processor to position said marker in said linked list after a current route entry of said plurality of route entries, said current route entry and ones of said plurality of route entries previous to said current route entry in said linked list having been processed by said first process.

* * * * *